United States Patent
Tang et al.

(10) Patent No.: US 10,567,043 B2
(45) Date of Patent: Feb. 18, 2020

(54) ANTENNA ARRANGEMENTS FOR INTERFERENCE ALIGNMENT IN LINE OF SIGHT WIRELESS COMMUNICATIONS

(71) Applicant: HUAWEI TECHNOLOGIES CO., LTD., Shenzhen, Guangdong (CN)

(72) Inventors: Taiwen Tang, Nepean (CA); Ahikam Aharony, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/429,929

(22) Filed: Feb. 10, 2017

(65) Prior Publication Data
US 2018/0234134 A1 Aug. 16, 2018

(51) Int. Cl.
H04B 7/024 (2017.01)
H04B 7/0456 (2017.01)
H04B 7/06 (2006.01)

(52) U.S. Cl.
CPC .......... H04B 7/024 (2013.01); H04B 7/0456 (2013.01); H04B 7/0691 (2013.01)

(58) Field of Classification Search
CPC .......... H04B 7/02; H04B 7/024; H04B 7/026; H04B 7/04; H04B 7/0404; H04B 7/0408; H04B 7/0413; H04B 7/0452; H04B 7/0456; H04B 7/0469; H04B 7/10; H04B 7/0691
USPC ................ 375/219, 220, 222, 259–262, 267; 342/724, 729, 751, 824, 826, 844, 853, 342/879, 893; 455/500, 88
See application file for complete search history.

(56) References Cited

U.S. PATENT DOCUMENTS

| 7,027,837 | B1 | 4/2006 | Uhlik et al. |
| 7,817,641 | B1 * | 10/2010 | Khandani ............ H04B 7/0682 370/395.4 |
| 8,385,305 | B1 | 2/2013 | Negus et al. |

(Continued)

FOREIGN PATENT DOCUMENTS

| CN | 1898836 A | 1/2007 |
| CN | 102651661 A | 8/2012 |

(Continued)

OTHER PUBLICATIONS

Lee, Seogoo, Distributed Real-Time Implementation of Interference Alignment with Analog Feedback, IEEE Transactions on Vehicular Technology, Aug. 2015, pp. 3513-3525.

(Continued)

*Primary Examiner* — Young T Tse
(74) *Attorney, Agent, or Firm* — BCF LLP

(57) ABSTRACT

An antenna arrangement includes antenna elements that are arranged, at each end of a Line of Sight communication link, into a selected shape. Distances between the antenna elements at each end of the link are determined based on a Line of Sight distance between the ends of the link and interference alignment between the antenna elements at the ends of the link. Different subsets of the antenna elements are coupled to communication modules at each end of the link. Signals are exchanged between the antenna elements at the ends of the link, and the signals are processed for interference alignment. The antenna element subsets may include two or more antenna elements, and may be unique or include common antenna elements that are common to multiple subsets.

26 Claims, 19 Drawing Sheets

(56) References Cited

U.S. PATENT DOCUMENTS

| | | | |
|---|---|---|---|
| 2005/0280572 A1* | 12/2005 | Shima | G01S 7/034 342/70 |
| 2006/0046662 A1* | 3/2006 | Moulsley | H04B 7/0689 455/69 |
| 2008/0026697 A1 | 1/2008 | Signell et al. | |
| 2009/0196272 A1* | 8/2009 | Tsutsui | H04B 7/0634 370/342 |
| 2011/0003608 A1* | 1/2011 | Forenza | H04B 7/01 455/501 |
| 2013/0051302 A1 | 2/2013 | Kim | |
| 2014/0140317 A1* | 5/2014 | Mobasher | H04B 7/024 370/330 |
| 2014/0266619 A1* | 9/2014 | Ali | G01S 13/00 340/10.1 |
| 2015/0372398 A1 | 12/2015 | Dudorov et al. | |
| 2016/0134345 A1 | 5/2016 | Maru | |
| 2016/0337008 A1 | 11/2016 | Li et al. | |
| 2016/0380707 A1 | 12/2016 | Olsson et al. | |
| 2017/0013505 A1* | 1/2017 | Shin | H04B 7/0619 |
| 2017/0085127 A1* | 3/2017 | Leabman | H02J 17/00 |

FOREIGN PATENT DOCUMENTS

| | | |
|---|---|---|
| CN | 103782524 A | 5/2014 |
| CN | 104767556 A | 7/2015 |
| CN | 104885302 A | 9/2015 |
| CN | 105896102 A | 8/2016 |
| CN | 105978835 A | 9/2016 |
| CN | 106027128 A | 10/2016 |
| WO | 2013192265 A1 | 12/2013 |
| WO | 2016036270 A1 | 3/2016 |

OTHER PUBLICATIONS

Peters, Steven W. et al., Interference Alignment via Alternating Minimization, IEEE, The University of Texas at Austin, 2009, 4 pages, USA.

Golub, Gene, et al, Matrix Computations, Third edition, 1983, Section 8.2.1 "The Power Method", 9 pages, London, England.

Extended European Search Report issued by the EPO in connection with Patent Application No. 18750922.9; dated Nov. 5, 2019.

* cited by examiner

ANTENNA ARRANGEMENTS FOR INTERFERENCE ALIGNMENT IN LINE OF SIGHT WIRELESS COMMUNICATIONS

FIELD

The present disclosure relates generally to communications and, in particular, to antenna arrangements for wireless communications.

BACKGROUND

Antenna systems with multiple antenna elements are used in various types of communication equipment. In Multiple-Input Multiple-Output (MIMO) systems, for example, multiple antenna elements are used to transmit and receive multiple signals. Signals are processed at transmitters and receivers to enable intended signals to be separated from interfering signals at receivers. Various factors may impact recovery of the intended signals at the receivers.

SUMMARY

An arrangement of antenna elements is designed by selecting a shape for the arrangement and distances between the antenna elements. The shape is to be applied to antenna elements at each end of a Line of Sight communication link. The distances between the antenna elements at each end of the link are determined based on a Line of Sight distance between the ends of the link and interference alignment between the antenna elements at the ends of the link. The antenna elements are arranged, at each end of the link, into the determined shape and at the determined distances.

Different subsets of the antenna elements are coupled to communication modules at each end of the link. Signals are exchanged between the antenna elements at the ends of the link, and the signals are processed for interference alignment.

According to one embodiment, an apparatus includes multiple communication modules and antenna elements. Different subsets of the antenna elements are coupled to each communication module. Distances between the antenna elements are selected based on a shape defined by the antenna elements, a Line of Sight distance between the antenna elements and remote antenna elements with which the antenna elements is intended to exchange signals, and interference alignment between the antenna elements and the remote antenna elements.

Another embodiment relates to a method. The method involves exchanging signals between antenna elements and remote antenna elements. The antenna elements include different subsets of the antenna elements coupled to different communication modules. Distances between the antenna elements are selected based on a shape defined by the antenna elements, a Line of Sight distance between the antenna elements and the remote antenna elements, and interference alignment between the antenna elements and the remote antenna elements. The method also involves processing the signals for interference alignment.

A method according to a further embodiment involves determining a shape for an arrangement of antenna elements and remote antenna elements between which signals are to be exchanged over a Line of Sight communication link. Distances between the antenna elements and distances between the remote antenna elements are determined based on the shape, a Line of Sight distance between the antenna elements and the remote antenna elements, and interference alignment between the antenna elements and the remote antenna elements. The method also involves arranging the antenna elements and the remote antenna elements into the determined shape and at the determined distances.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
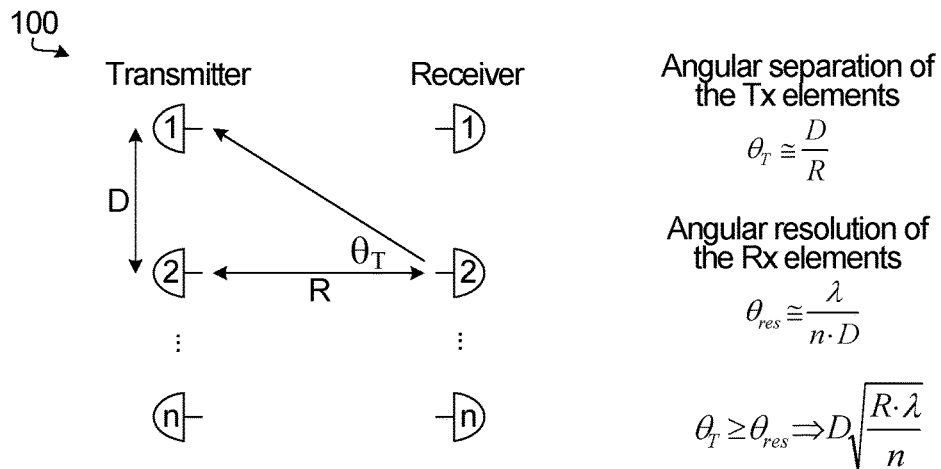
FIG. 1 includes block diagrams illustrating an example Line of Sight (LoS) MIMO system and signal recovery.

FIG. 1 includes block diagrams illustrating an example LoS MIMO system and signal recovery. In such a system, a received signal y=Hx+noise, where x is a transmitted signal and H is a channel matrix. FIG. 1 illustrates a general example MIMO system 100 in which a transmitter and a receiver each have n antenna elements, and a specific example of a 2×2 MIMO system 110 in which the transmitter and receiver each have 2 antenna elements.

The H matrix for the 2×2 MIMO system 110 in FIG. 1 is $$H = \begin{bmatrix} 1 & i \\ i & 1 \end{bmatrix}.$$

The entries in each row of the H matrix are not identical in this example, to provide a MIMO channel rank close to 2. For an LoS channel and a given distance between a transmitter and a receiver, not all antenna arrangements and antenna spacings can provide rank >1.

Figure 2:
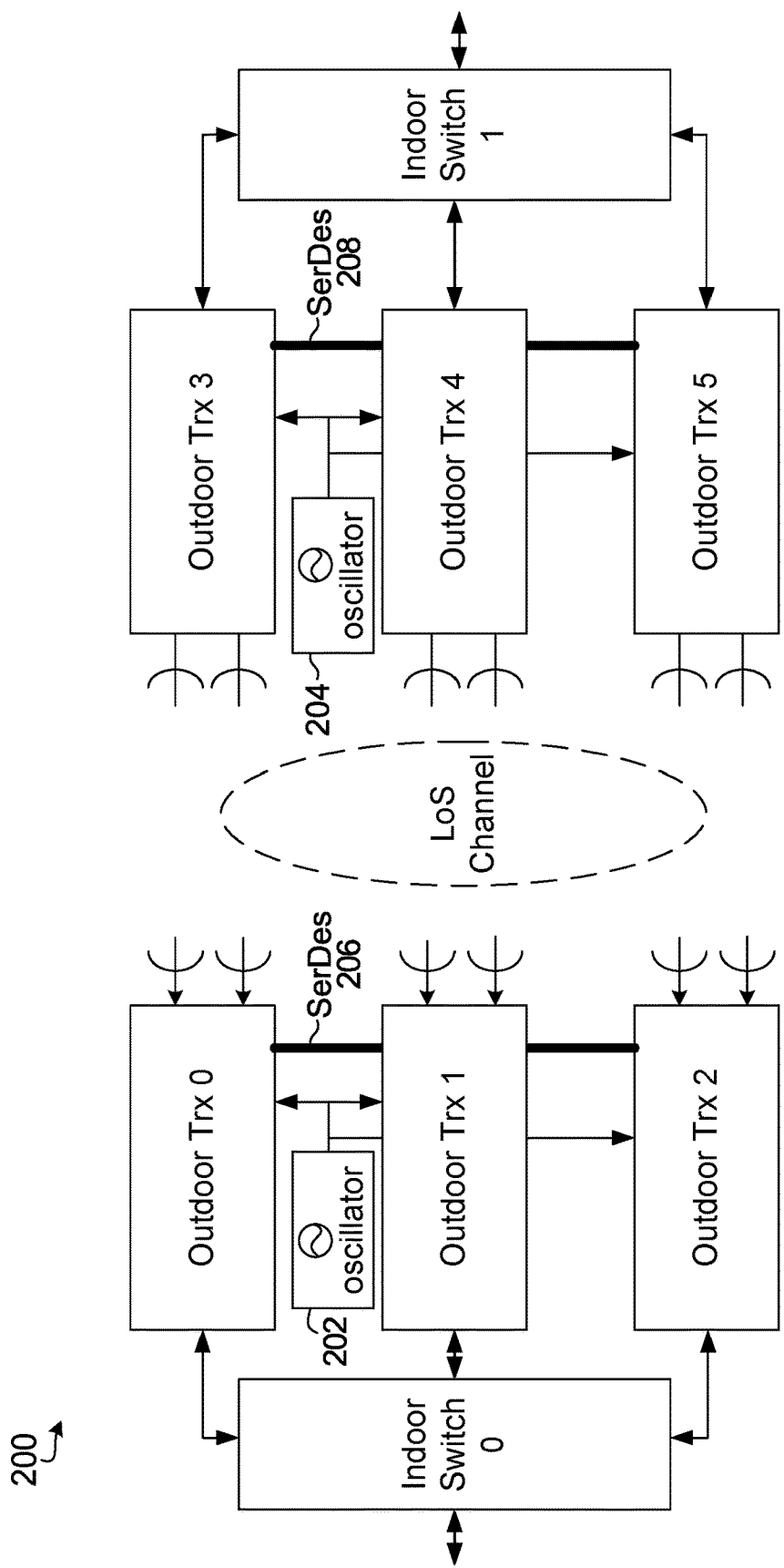
FIG. 2 is a block diagram illustrating another example LoS MIMO system with shared oscillators and interconnections for exchange of signals between transceivers.

FIG. 2 is a block diagram illustrating an LoS MIMO system 200 with shared oscillators 202, 204 and interconnections 206, 208 for exchange of signals between transceivers. In the system 200, at each end of an LoS channel, three outdoor transceivers (Trx) are coupled to an indoor switch, and to the same shared oscillator 202, 204. The outdoor transceivers Trx 0, Trx 1, Trx 2 are also interconnected to each other, through a high-speed Serializer/Deserializer (SerDes) connection 206 in the example shown. The outdoor transceivers Trx 3, Trx 4, Trx 5 are similarly interconnected to each other through a high-speed SerDes connection 208.

In the system 200, all transmitting antennas have to be coherent, and must use the same oscillator for a transmit upconverter in order to operate properly. If a shared oscillator structure is not used, then signals may add up destructively due to phase noise, resulting in low throughput. The example system 200 also requires the high-speed SerDes connections 206, 208 for exchange of the signals that are transmitted or received on different antennas, between the outdoor transceivers.

However, for practical reasons it may be preferable not to share local oscillators between separate transceiver units such as the outdoor transceivers Trx 0, Trx 1, Trx 2 and Trx 3, Trx 4, Trx5 shown in FIG. 2. Some outdoor transceiver units include only two antenna elements and Radio Frequency (RF) chains, and therefore implementing a MIMO system of order higher than 2×2 using such transceiver units and an architecture as shown in FIG. 2 cannot avoid shared oscillators and transceiver unit interconnections.

Figure 3:
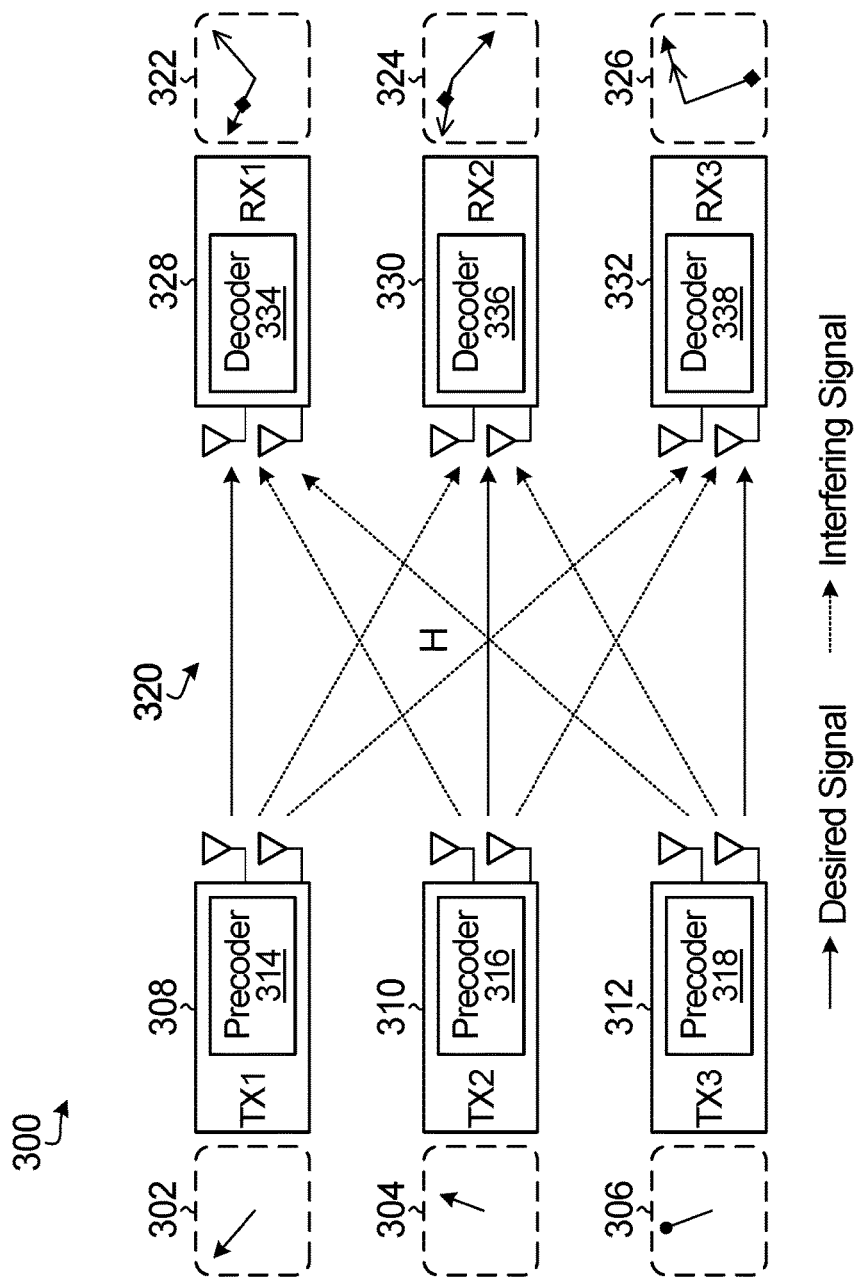
FIG. 3 is a block diagram illustrating a further example MIMO system with transmitter precoders and receiver decoders.

FIG. 3 is a block diagram illustrating a further example MIMO system 300 with transmitter precoders and receiver decoders, from Seogoo Lee, Andreas Gerstlauer, and Robert W. Heath, Jr., "Distributed Real-Time Implementation of Interference Alignment with Analog Feedback", IEEE Transactions on Vehicular Technology, Vol. 64, No. 8, August 2015, pp. 3513-3525. In FIG. 3, the signals 302, 304, 306 are transmitted by the transmitters 308, 310, 312 over a wireless channel 320, and are intended for the receivers 328, 330, 332, respectively. Precoding by the precoders 314, 316, 318 and decoding by the decoders 324, 326, 328 is designed such that the non-intended signals received by each receiver 328, 330, 332 are aligned, as shown at 322, 324, 326. This is known as interference alignment.

Interference alignment can be generally expressed as $$W_k^H H_{k,m} F_m = 0$$

$$\text{rank}(W_k^H H_{k,k} F_k) = N_S$$

where $W_k$ is a kth decoding matrix applied by a decoder 334, 336, 338 at a kth receiver 328, 330, 332, $F_m$ is an mth precoding matrix applied by a precoder 314, 316, 318 at an mth transmitter 308, 310, 312, $H_{k,m}$ is a channel matrix between a kth transmitter and an mth receiver, and $N_s$ is a number of streams per transmitter and receiver pair, which is 1 in this example.

Each transmitter 308, 310, 312 and each receiver 328, 330, 332 has its own local oscillator, but a single oscillator is not shared among the transmitters or among the receivers. The transmitters 308, 310, 312 are also not interconnected to exchange transmitted signals, and similarly the receivers 328, 330, 332 are not interconnected to exchange received signals. The oscillator sharing and interconnection shown in FIG. 2 are thereby avoided in the example shown in FIG. 3.

Figure 4:
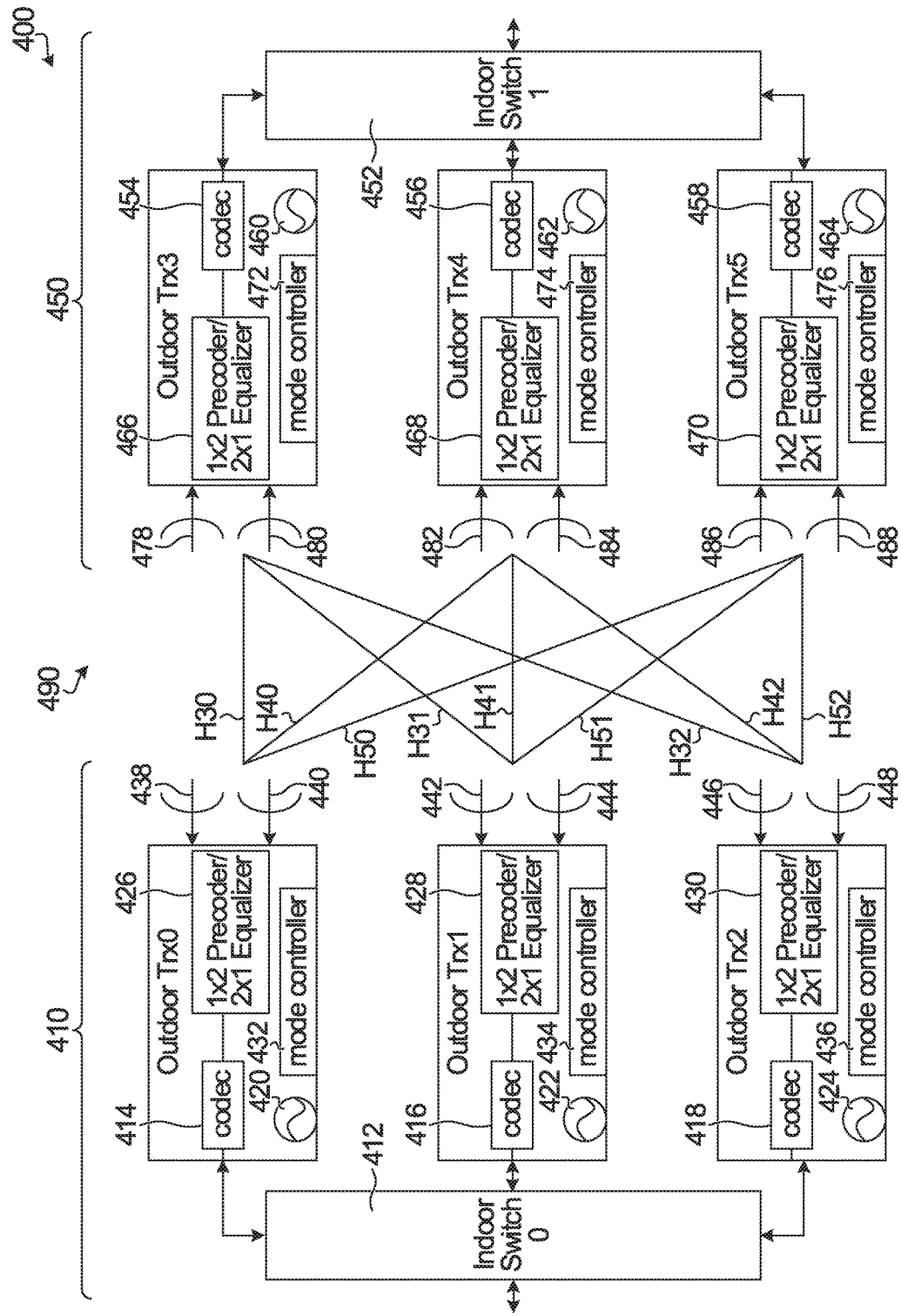
FIG. 4 is a block diagram illustrating a MIMO system in accordance with an embodiment.

FIG. 4 is a block diagram illustrating a MIMO system in accordance with an embodiment. The example MIMO system 400 includes equipment 410, 450 at each end of a wireless link or channel 490. As described in further detail herein, a special antenna arrangement is used to provide an effective channel rank.

The equipment 410, 450 at each end of the wireless channel 490 includes an indoor switch 412, 452 and outdoor transceivers Trx0, Trx1, Trx2, Trx3, Trx4, Trx5. The "indoor" and "outdoor" designations in FIG. 4 represent one example implementation, in which main switches such as 412, 452 are located inside a building or other switching facility, and wireless communication equipment such as the transceivers Trx0, Trx1, Trx2, Trx3, Trx4, Trx5 are implemented in ODUs, which are located outside the building or switching facility that houses the main switches and possibly other equipment.

Each of the transceivers Trx0, Trx1, Trx2, Trx3, Trx4, Trx5 includes a codec 414, 416, 418, 454, 456, 458, an oscillator 420, 422, 424, 460, 462, 464, a mode controller 432, 434, 436, 472, 474, 476, and a 1×2 precoder/2×1 equalizer 426, 428, 430, 466, 468, 470. Two antenna elements 438/440, 442/444, 446/448, 478/480, 482/484, 486/488 are also provided for each transceiver Trx0, Trx1, Trx2, Trx3, Trx4, Trx5 in the example shown.

The switches 412, 452 could be any of various types of switch. The particular type of switch is implementation-dependent, taking into account such factors as the type of network or equipment to which the switches 412, 452 are to be connected, the type(s) of signal(s) to be switched by the switches, and the numbers of switch inputs and outputs to be provided. The switches 412, 452 are illustrated only for illustrative purposes. The antenna arrangements disclosed herein are not dependent upon a switched structure as shown in FIG. 4 or any particular implementation of the switches 412, 452.

An ODU is an example of equipment that could be used to implement each transceiver Trx0, Trx1, Trx2, Trx3, Trx4, Trx5. For example, the components that are shown inside each transceiver Trx0, Trx1, Trx2, Trx3, Trx4, Trx5 in FIG. 4 could be housed in an ODU housing, to which a pair of antenna elements 438/440, 442/444, 446/448, 478/480, 482/484, 486/488 is mounted. Other implementations are also possible.

Those skilled in the art will be familiar with various forms of communication modules that could be used to implement the transceivers Trx0, Trx1, Trx2, Trx3, Trx4, Trx5. Each codec 414, 416, 418, 454, 456, 458, mode controller 432, 434, 436, 472, 474, 476, and precoder/equalizer 426, 428, 430, 466, 468, 470 could be implemented, for example, using hardware, firmware, one or more components that execute software that is stored in a memory device, or some combination thereof. Electronic devices that might be suitable for implementing these components, and/or possibly other transceiver components, include microprocessors, microcontrollers, Programmable Logic Devices (PLDs), Field Programmable Gate Arrays (FPGAs), Application Specific Integrated Circuits (ASICs), and other types of "intelligent" integrated circuits. These electronic devices are illustrative of circuitry that could be configured to implement receivers, transmitters, or both receivers and transmitters such as the transceivers Trx1, Trx2, Trx3, Trx4, Trx5. In a processor-based implementation, for example, processor-executable instructions to configure one or more processors to perform coding, decoding, mode control, precoding, equalization, and/or other operations are stored in a non-transitory processor-readable medium in each transceiver Trx0, Trx1, Trx2, Trx3, Trx4, Trx5.

Any of various forms of oscillators could be used to implement the oscillators 420, 422, 424, 460, 462, 464, which provide a timing base for components in each transceiver Trx0, Trx1, Trx2, Trx3, Trx4, Trx5. The oscillators 420, 422, 424, 460, 462, 464 are independent from each other, and therefore the example system 400 is not a shared oscillator system. Connections between the transceivers Trx0, Trx1, Trx2, Trx3, Trx4, Trx5 for exchange of transmitted signals between the transceivers are also avoided.

The transceivers Trx0, Trx1, Trx2, Trx3, Trx4, Trx5 could include other components which have not been shown in FIG. 4 to avoid congestion in the drawing. For example, a separate RF chain could be coupled between each of the precoders/equalizers 426, 428, 430, 466, 468, 470 and each of the antenna elements 438/440, 442/444, 446/448, 478/480, 482/484, 486/488. A receive RF chain could include such components as a downconverter, a demodulator, and an amplifier. A transmit RF chain could include such components as an amplifier, a modulator, and an upconverter. An RF chain could include both a receive RF chain and a transmit RF chain in a transceiver-based embodiment as shown in FIG. 4.

Although FIG. 4 illustrates transceivers, it should be appreciated that the transceivers are one example of a communication module. Other embodiments could be implemented in conjunction with communication modules that include only a receiver, only a transmitter, or both a receiver and a transmitter implemented in some other manner than as a transceiver. In the case of a receiver instead of a transceiver, a precoder/equalizer as shown in FIG. 4 could be implemented as a precoder. Similarly, a precoder/equalizer as shown in FIG. 4 could be implemented as an equalizer in a transmitter.

The antenna elements 438/440, 442/444, 446/448, 478/480, 482/484, 486/488 could be implemented in any of various ways, dependent upon such factors as the type(s) of wireless signals that are to be transmitted and/or received, frequency bands, and available space. The exact form of the antenna elements 438/440, 442/444, 446/448, 478/480, 482/484, 486/488 is implementation-dependent. The antenna elements 438/440, 442/444, 446/448, 478/480, 482/484, 486/488 are arranged as disclosed herein to provide for interference alignment in respect of signals that are received by, but intended for, each transceiver Trx0, Trx1, Trx2, Trx3, Trx4, Trx5.

Turning now to operation of the system 400, consider an example in which three signals that are switched to the transceivers Trx0, Trx1, and Trx2 by the switch 412 are intended for the transceivers Trx3, Trx4, Trx5. The precoders/equalizers 426, 428, 430 apply matrices that are typically referred to as precoding matrices $F_0$, $F_1$, and $F_2$, respectively, to input signals that have been coded by the codecs 414, 416, 418, and the precoded signals are transmitted over the wireless channel 490 using the antenna elements 438/440, 442/444, 446/448. Channel matrices for paths between each transmitting transceiver Trx0, Trx1, Trx2 and each receiving transceiver Trx3, Trx4, Trx5 in this example are labeled in FIG. 4.

Transmitted signals are received at the receiving transceivers Trx3, Trx4, Trx5 through the antenna elements 478/480, 482/484, 486/488. The precoders/equalizers 426, 428, 430, the wireless channel 490, and the receiving antenna elements 478/480, 482/484, 486/488 in this example could be considered an equivalent 6×3 channel, with 6 outputs from the receiving antenna elements at the receiving equipment 450 and 3 inputs to the precoders/equalizers at the transmitting equipment 410.

At the receiving equipment 450, the precoders/equalizers 466, 468, 470 apply matrices that are typically referred to as decoding, combining, or equalization matrices $W_0$, $W_1$, and $W_2$, respectively, to the signals that are received by each of the receiving antenna elements 478/480, 482/484, 486/488, and provide the resultant signals to the codecs 454, 456, 458, which in turn provide decoded signals to the switch 452 in the example shown.

Arrangement of the antenna elements and determination of the precoding and equalization matrices as disclosed herein align interference at each receiving transceiver Trx3, Trx4, Trx5.

In general, antenna arrangements may be selected to reduce the number of distance or spacing parameters that might otherwise be used to parameterize an antenna distance configuration. Such parameters could be considered constraints for distance optimization. For example, a shape constraint could include two parts, specifically a shape without rotation between transmitting and receiving antenna elements, and a shape with a rotation angle. Rotation angles of 0, 90, 180 and 270 degrees are considered by way of example herein, for simplicity. Other rotation angles could also or instead be used in other embodiments.

Using antenna arrangements such as the examples described below with reference to FIGS. 5 to 14, distances could be parameterized as an in-unit antenna spacing d1 and cross-unit antenna spacing d2. The parameter d1 specifies the distance between the antennas of the same unit, and the parameter d2 specifies the nonzero distance between the antennas of different units. A two-parameter parameterization is an illustrative example. For some antenna arrangements, one parameter could be used to parameterize all antenna spacings, and in other embodiments more than two parameters could be used.

According to a particular embodiment, antenna spacing is in a range of $[0, \sqrt{\lambda*D}]$, where D is the direct LoS distance between transmitting antenna elements and receiving antenna elements. This range covers a range of [0, 180] degrees of phase difference between two paths of two transmitting antennas to one receiving antenna. For a given shape and a given rotation angle in this example, the spacing range of $[0, \sqrt{\lambda*D}]$ could be searched to find a pair of values of d1 and d2, each within this spacing range, that optimizes interference alignment for the particular shape and rotation angle. In an example referenced above, a search includes each of 0, 90, 180 and 270 degrees of rotation for each shape, to determine the antenna spacings and rotation that are optimal for each shape, among these four rotation angles. For example, a search could be performed at 0 degree rotation, then 90 degree rotation, and so on, and the optimal rotation angle between the rotation angles at which a search is performed could be selected based on the values of d1 and d2 that provide the best interference alignment among all values of d1 and d2 for all of the searches.

Optimal or best as referenced herein relates to optimal or best among searched values. Truly optimal or best values might not be within a search space in some embodiments. For example, in the above example in which rotation angles of 0, 90, 180 and 270 degrees are searched, optimal values of d1 and d2 are optimal from among the searched rotation angles and the searched values of d1 and d2. If the true optimal rotation angle were 30 degrees, then the optimal values of d1 and d2 and the optimal rotation angle identified in this example search procedure would not be optimal among all possible values. Step sizes between searched values of distance parameters such as d1 and d2 also affect whether identified optimal values are truly optimal. Truly optimal values of d1 and/or d2 could be between searched values, in which case the identified or selected optimal values are optimal among searched values but are not optimal among all possible values.

A search of all possible values for antenna spacings and/or rotation angles is not feasible in practice. Search spaces and step sizes are limited in practice, and therefore optimal or best antenna spacings and rotation angles are optimal or best among values that are searched. References to optimal or best herein should be interpreted accordingly.

Any of many search algorithms could be used for d1 and d2. These include, for example, a steepest gradient search and a genetic algorithm. For illustrative purposes, a simple search technique is described herein as an example. Other search algorithms could be used in other embodiments. The present disclosure is not limited to any particular search techniques.

In an embodiment, a search uses a search space that includes values of $\sqrt{0.1*k*\lambda*D/2}$, for k=0, 1, 2, ..., 20. After finding value k0 for k that corresponds to the best spacing within that search space, then a further search space that includes more closely spaced values of a format $\sqrt{0.1*\lambda*D/2*(k0+0.01*j)}$ for j in the range of −50 to 50, near $\sqrt{0.1*k0*\lambda*D/2}$, could be searched to provide higher granularity or precision and to fine-tune the search by identifying a value j0 of j corresponding to the best spacing within that further search space. A rounded value of $\sqrt{\lambda*D*a/b}$, where a is an integer and b is an integer multiple of 2 or 3, is chosen to represent the search result $\sqrt{0.1*(k0+0.01*j0)*\lambda*D/2}$ in an embodiment. This rounded value of antenna spacing provides approximately 180*a/b degrees of phase difference between two propagation paths, in the case of a pair of antenna elements at each end of a link.

The search procedure and search spaces described above are illustrative examples. Other similar or different procedures and/or search spaces could be used in other embodiments.

Regarding matrices that are applied at transmitting and receiving communication modules, precoding matrices and equalization matrices are determined based on channel matrices. Information associated with precoding matrices could be determined at receiving communication modules and fed back to transmitting communication modules. An information exchange rate for such information is generally much lower than a data rate, because only channel state information or matrix information is quantized and exchanged. This type of information could be carried as part of data traffic and fed back between transmitters and receivers. There are several ways to implement such feedback.

For example, estimated channel matrices H(a,b), where a is the receiver index and b is the transmitter index, could be computed at each receiver and fed back to each transmitter. Precoding matrices could instead be computed at the receivers, based on the estimated channel matrices, and fed back to the transmitters. Channel matrices are shown without commas in FIG. 4 to avoid congestion in the drawings, and accordingly the following reference characters denote channel matrices: H30, H31, H32, H40, H41, H42, H50, H51 and H52.

The mode controllers 432, 434, 436, 472, 474, 476 are implemented in some embodiments to provide operating mode control based on one or more measures of channel quality of the wireless channel 490. In the above example, the receiving transceivers Trx3, Trx4, Trx5 could measure, calculate, or otherwise determine one or more measures of channel quality, and feed back an indication of channel quality to its intended transmitting transceiver. Any of various types of channel quality monitoring and feedback mechanisms could be implemented.

Based on wireless channel quality, the mode controllers 432, 434, 436, 472, 474, 476 control operation of the transceivers Trx0, Trx1, Trx2, Trx3, Trx4, Trx5. In an embodiment, the mode controllers 432, 434, 436, 472, 474, 476 control whether the transceivers Trx0, Trx1, Trx2, Trx3, Trx4, Trx5 operate in an interference alignment mode, to provide an equivalent 6×3 channel as noted above, or in a redundancy mode, in which copies of the same information are used at multiple transmitters to determine precoding matrices. The interference alignment mode in this example could provide a throughput increase of as much as 50% over the redundancy mode, because the interference alignment mode supports transfer of three streams instead of two over the wireless channel 490. The mode controllers 432, 434, 436, 472, 474, 476 provide control signals to the codecs 414, 416, 418, 454, 456, 458 and/or to other transceiver components, to control whether the transceivers operate in interference alignment mode or redundancy mode. Redundancy mode refers to transceiver redundancy in the sense that if one transceiver fails, then multiple streams can still be transferred over a link. Consider the example in FIG. 4, with three transceivers at each end of the wireless channel 490. In the event of failure of one transceiver, such as Trx0, two streams can still be transferred between the equipment 410, 450, using the remaining two transceivers Trx1, Trx2 at the equipment 410 and the corresponding two transceivers Trx4, Trx4 at the equipment 450.

In an embodiment, mode controllers 472, 474, 476 at receiving transceivers make decision on switching between operating modes. The mode controllers 472, 474, 476 could computer or otherwise obtain channel quality information, and feed back control information such as a mode switch command and a mode switch time to mode controllers 432, 434, 436 at transmitting transceivers. Upon a timer or system time reaching the mode switch time, which could be negotiated in some embodiments, both receiving transceivers and transmitting transceivers switch from one operating mode to another operating mode.

The three-stream or two-stream operating mode example referenced above could be implemented in conjunction with wireless channel quality monitoring in which failure of one transmitting transceiver and/or one receiving transceiver can be detected based on wireless channel quality assessment. Other operating modes and/or other operating mode transition criteria could be provided instead of or in addition to these examples, in other embodiments.

Figure 5:
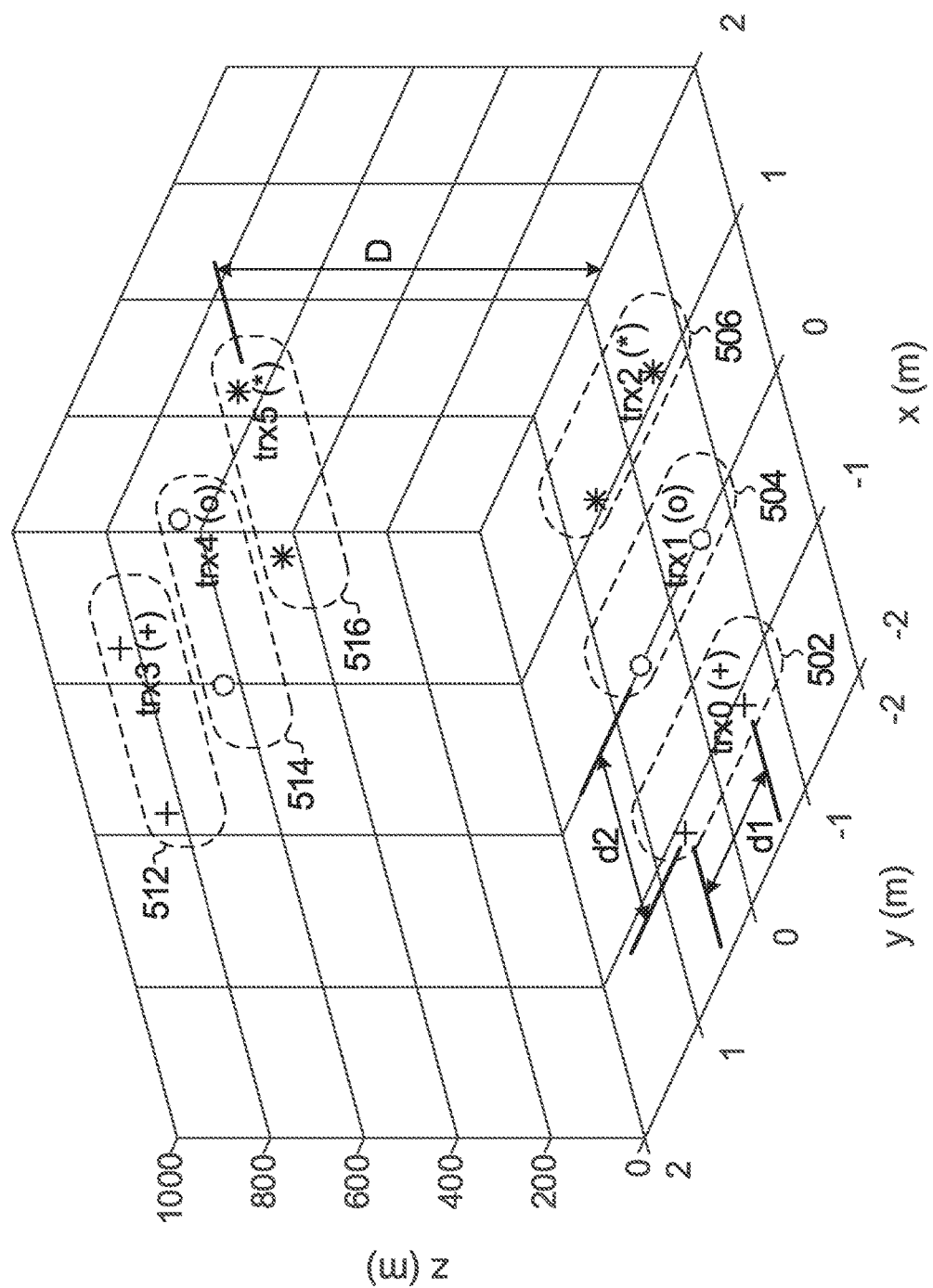
FIG. 5 is a plot illustrating an example antenna arrangement referred to herein as a "chocolate bar" arrangement, that includes a respective pair of antenna elements for connection to each of three transceivers at each end of a wireless communication link.

FIG. 5 is a plot illustrating an example antenna arrangement referred to herein as a "chocolate bar" arrangement, that includes a respective pair of antenna elements for connection to each of three transceivers at each end of a wireless communication link. The crosses, circles, and asterisks in FIG. 5 denote vertices at which antennas are positioned, and each of the pairs of vertices 502, 504, 506, 512, 514, 516 corresponds to positions of antenna elements that are coupled to the same transceiver. For example, the antenna elements 438, 440 coupled to the transceiver Trx0 in FIG. 4 are located at the vertices 502 in FIG. 5. The "trx" labels in FIG. 5 correspond to the similar "Trx" labels in FIG. 4, and the example above in which Trx3, Trx4, Trx5 are the intended receivers of signals that are transmitted by Trx0, Trx1, Trx2, respectively. The symbols in FIG. 5 are also intended to denote this example, in which signals transmitted by antenna elements that are positioned at one pair of vertices that are labelled with a symbol are intended for transceivers that are coupled to antenna element pairs at the corresponding vertices that carry the same symbol. Intended wireless communications are between transceivers that are coupled to antenna element pairs at the cross vertices 502, 512, between transceivers that are coupled to antenna element pairs at the circle vertices 504, 514, and between transceivers that are coupled to antenna element pairs at the asterisk vertices 506, 516. This notation is carried throughout other drawings that illustrate example antenna arrangements as well.

In implementing an antenna arrangement in accordance with FIG. 5, a respective pair of antenna elements is provided at each vertex in each pair, for connection to three transceivers at each end of a wireless communication link. Each of the transceivers is therefore coupled to a unique pair of the antenna elements. The antenna elements in each pair are aligned with each other in a first direction. For the vertex pairs 502, 504, 506, this alignment within each pair is in the y direction, with a common x component for each vertex in any single pair. For the vertex pairs 512, 514, 516, the alignment within each pair is in the x direction, with a common y component for each vertex in any single pair.

Thus, with reference to any single pair, the antenna elements are aligned with each other in a first direction. The antenna elements in each pair are also aligned with the antenna elements in other pairs along parallel rows in a second direction perpendicular to the first direction. Consider the vertex pair 502, with alignment within the pair in the y direction as described above. Each vertex, and accordingly each antenna element positioned at each vertex, is aligned with vertices and antenna elements in the other pairs 504, 506 along parallel rows in the x direction, with a common y component along each row. The pairs 512, 514, 516 are similarly arranged, with x-direction alignment of vertices and antenna elements within each pair and y-direction alignment of vertices and antenna elements in different pairs.

The arrangement in FIG. 5 also illustrates sets of vertices, and associated antenna elements, with a 90 degree rotation relative to each other. Consider the pairs 502, 504, 506. Relative to remote antenna elements at the pairs 512, 514, 516, the pairs 502, 504, 506 and the antenna elements at those vertices have a rotation of 90 degrees about an axis parallel to a propagation direction which is the z direction in FIG. 5.

FIG. 5 also illustrates antenna element distance parameters d1 and d2, as well as the distance D between the antenna elements at each end of a communication link.

The distance d1 between vertices in each pair 502, 504, 506, and the distance d2 between adjacent pairs 502/504 and 504/506 are the same, and are chosen to be close to $\sqrt{\lambda^*D}/3$ based on a search of a spacing range of [0 to $\sqrt{\lambda^*D}$], and rotation angles of 0, 90, 180, and 270 degrees. With d1 and d2 constrained to be equal and LoS distance D of 1000 m, d1=d2=$\sqrt{\lambda^*D}/3$ was found to optimize interference alignment at a receiver, among searched values.

Optimizing antenna element distances or spacing is based on a "grid" search in an embodiment. A set of distances, within [0 to $\sqrt{\lambda^*D}$] and for uniformly spaced vertices and antenna elements for example, could be considered a grid or search space. Alternating minimization for each distance or grid point, or each set of grid points if uniform spacing is not used, is performed to derive sum Signal to Noise Ratio (SNR) in an embodiment, and the distance with maximum sum SNR is selected. This could be repeated at different rotation angles, and the distance corresponding to the overall highest sum SNR among all searched rotation angles could be selected as the optimum distance.

Sum SNR is a summation in dB of post-equalization signal to noise power ratio. It is approximately a scaled version of the summation of the spectrum efficiency of each stream. A characteristic other than sum SNR could be used in other embodiments to select optimum distance.

The precoding and equalization matrices are determined via alternating minimization based on estimated channels. The channel estimation could be performed based on preambles sent from each transmitter, for example.

Alternating minimization could be based on Peters and Heath, *Interference Alignment Via Alternating Minimization*, ICASSP 2009, © 2009, pp. 2445-2448. In one embodiment, alternating minimization involves designing $W_k$ and $F_m$ so that $$\text{rank}(W_0^*H_{00}^*F_0)=N_S$$

$$\text{rank}(W_1^*H_{11}^*F_1)=N_S$$

$$\text{rank}(W_2^*H_{22}^*F_2)=N_S$$

$$W_0^*H_{01}^*F_1=0$$

$$W_0^*H_{02}^*F_2=0$$

$$W_1^*H_{10}^*F_0=0$$

$$W_1^*H_{12}^*F_2=0$$

$$W_2^*H_{20}^*F_0=0$$

$$W_2^*H_{21}^*F_1=0$$

where $N_S=1$ for co-polar interference alignment and $N_S=2$ for Cross-Polarization Interference Cancellation (XPIC) interference alignment.

For co-polar IA:
initialize F0, F1, F2 as $F0=[1;1i]./2^{\wedge}0.5;$ $F1=[1;1]./2^{\wedge}0.5;$ $F2=[1i;1]./2^{\wedge}0.5;$ for itr=1:iteration_number

[U0,e0]=eig(H01'*F1*F1'*H01'+H02*F2*F2'*H02');

[U1,e1]=eig(H10*F0*F0'*H10'+H12*F2*F2'*H12');

[U2,e2]=eig(H20*F0*F0'*H20'+H21*F1*F1'*H21');

[rst0,id0]=sort(abs(diag(e0)),'descend');

C0=U0(:,id0([1]));

[rst1,id1]=sort(abs(diag(e1)),'descend');

C1=U1(:,id1([1]));

[rst2,id2]=sort(abs(diag(e2)),'descend');

C2=U2(:,id2([1]));

[V0,t0]=eig(H10'*(eye(2,2)−C1*C1')*H10+H20'*(eye(2,2)−C2*C2')*H20);

[V1,t1]=eig(H01'*(eye(2,2)−C0*C0')*H01+H21'*(eye(2,2)−C2*C2')*H21);

[V2,t2]=eig(H02'*(eye(2,2)−C0*C0')*H02+H12'*(eye(2,2)−C1*C1')*H12);

[rst4,id4]=sort(abs(diag(t0)),'ascend');

F0=V0(:,id4([1]));

[rst5,id5]=sort(abs(diag(t1)),'ascend');

F1=V1(:,id5([1]));

[rst6,id6]=sort(abs(diag(t2)),'ascend');

F2=V2(:,id6([1]));

W0=U0(:,id0([2]));

W1=U1(:,id1([2]));

W2=U2(:,id2([2]));

end

For XPIC IA:
initialize F0, F1, F2 as $F0=[1\ 1;1\ -1;-1\ 0;0\ -1]./2^{\wedge}0.5;$ $F1=[\exp(pi/3*1i)1;1\ \exp(pi/3*1i);1\ 0;0\ 1]./2^{\wedge}0.5;$ $F2=[1\ 0;0\ 1;\exp(-pi/3*1i);1\ \exp(-pi/3*1i)]./2^{\wedge}0.5;$ for itr=1:iteration_number

[U0,e0]=eig(H01*F1*F1'*H01'+H02*F2*F2'*H02');

[U1,e1]=eig(H10*F0*F0'*H10'+H12*F2*F2'*H12');

[U2,e2]=eig(H20*F0*F0'*H20'+H21*F1*F1'*H21');

[rst0,id0]=sort(abs(diag(e0)),'descend');

C0=U0(:,id0([1,2]));

[rst1,id1]=sort(abs(diag(e1)),'descend');

C1=U1(:,id1([1,2]));

[rst2,id2]=sort(abs(diag(e2)),'descend');

C2=U2(:,id2([1,2]));

[V0,t0]=eig(H10'*(eye(4,4)−C1*C1')*H10+H20'*(eye(4,4)−C2*C2')*H20);

[V1,t1]=eig(H01'*(eye(4,4)−C0*C0')*H01+H21'*(eye(4,4)−C2*C2')*H21);

[V2,t2]=eig(H02'*(eye(4,4)−C0*C0')*H02+H12'*(eye(4,4)−C1*C1')*H12);

[rst4,id4]=sort(abs(diag(t0)),'ascend');

F0=V0(:,id4([1,2]));

[rst5,id5]=sort(abs(diag(t1)),'ascend');

F1=V1(:,id5([1,2]));

[rst6,id6]=sort(abs(diag(t2)),'ascend');

F2=V2(:,id6([1,2]));

W0=U0(:,id0([3 4]));

W1=U1(:,id1([3 4]));

W2=U2(:,id2([3 4]));

end

In these examples:

./ represents element-wise division;

[Ux,ey] represents the two outputs of eigen-decomposition, namely the eigen-vectors stacked in matrix form Ux, and the eigenvalues in a diagonal matrix form ey;

eig( ) represents eigen-decomposition;

[rstx, idy] represents a sort output, namely the values in ascending order ('ascend') or descending order ('descend') and the corresponding indices of these values;

sort( ) represents a sort of an array which outputs sorted values and indices after sorting;

diag( ) represents stacking of diagonal terms of a matrix e0 into a vector; and

Ux(:,idy([z])) represents the zth element in the index vector idy column of matrix U0.

A standard Digital Signal Processor (DSP) solver could be used to solve the eig( ) operation. In an Application-Specific Integrated Circuit (ASIC) implementation, an iterative method based on the Power method (G. Golub and C. Van Loan, *Matrix Computations*, The Johns Hopkins University Press, Baltimore, third edition, 1996) for a 4×4 case. For a 2×2 case, a closed form solution for the eigenvalues and eigenvectors is possible.

The antenna arrangement shown in FIG. 5 and the precoding and equalization matrices described above align interference at each receiving transceiver and provide alternating minimization. For example, a signal transmitted from trx0 is minimized at trx4 but has higher power at trx3 and trx5, a signal transmitted from trx1 is minimized at trx5 but has higher power at trx3 and trx4, and a signal transmitted from trx2 is minimized at trx3 but has higher power at trx4 and trx5.

Other antenna arrangements and matrices may provide similar effects at receiving transceivers or other communication modules.

Figure 6:
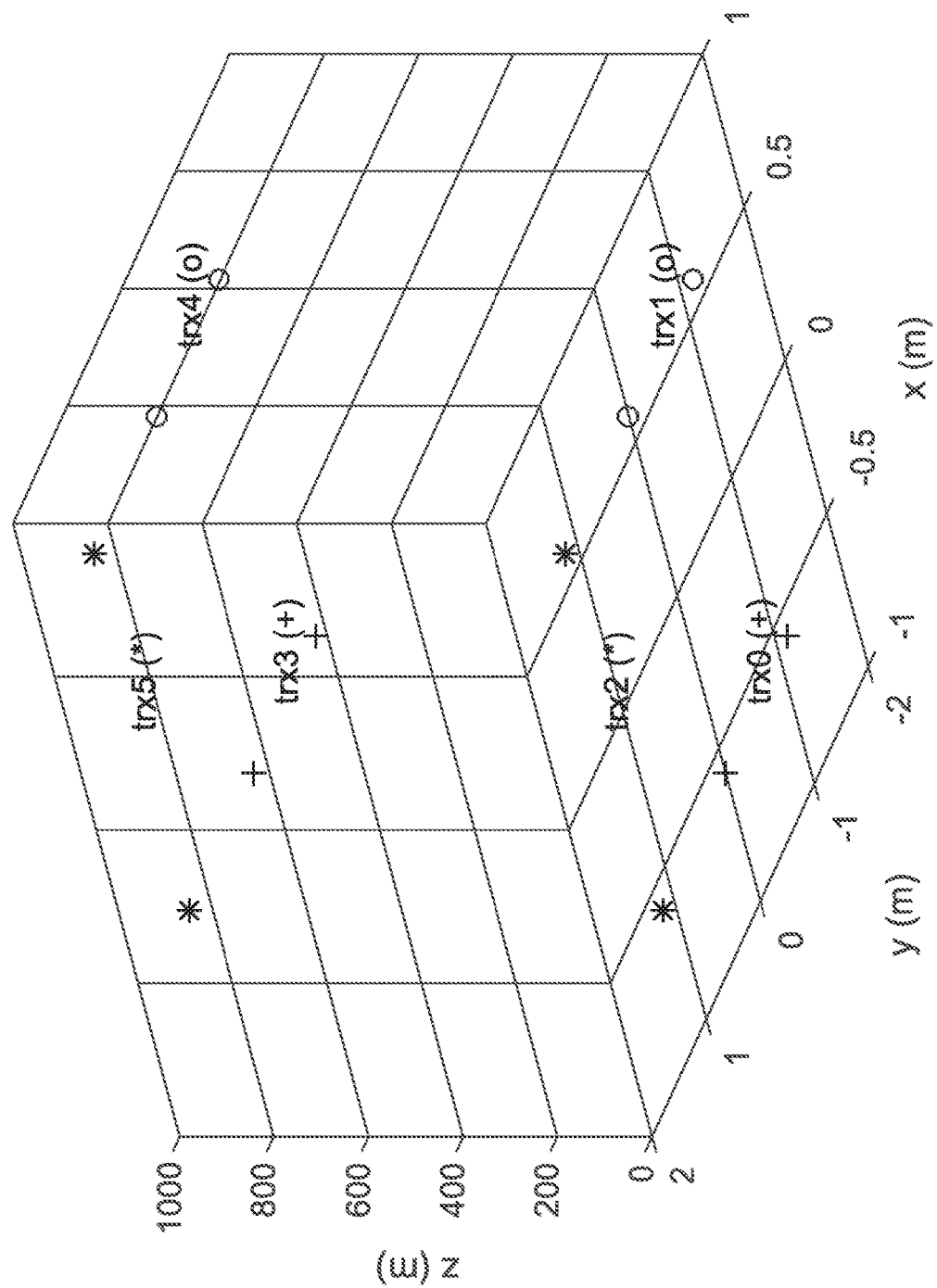
FIG. 6 is a plot illustrating another example antenna arrangement referred to herein as a "rectangle" arrangement, in which antenna elements are arranged differently than in FIG. 5.

FIG. 6 is a plot illustrating another example antenna arrangement referred to herein as a "rectangle" arrangement, in which antenna elements are arranged differently than in FIG. 5. In implementing an antenna arrangement in accordance with FIG. 6, as described above with reference to FIG. 5, a respective pair of antenna elements is provided at each vertex in each pair, for connection to three transceivers at each end of a wireless communication link, and each of the transceivers is therefore coupled to a unique pair of the antenna elements. The antenna elements at the cross and circle vertex pairs are aligned with each other in a first direction, the y direction with a common x component in each pair. The antenna elements at the asterisk vertex pairs are aligned with each other in a second direction, the x direction with a common y component, perpendicular to the first direction. The cross and circle vertices, and the antenna elements at those vertices, are each aligned with one of the vertices in the asterisk vertex pair along the first direction, which is the y direction in the example shown. In FIG. 6, the relative rotation between vertices, and the antenna elements at those vertices, is 0.

As in the example shown in FIG. 5, the distance d1 between the vertices in each pair and the distances between adjacent vertices in different pairs are constrained to be the same (d1=d2) to simplify the optimization search, and are chosen to be close to $\sqrt{\lambda*D*3/8}$ based on the optimization search for the specific example of D=1000 m. Based on an antenna spacing search at each of 0, 90, 180, and 270 degrees, 0 degree rotation is selected as optimal in this antenna arrangement.

The precoding and equalization matrices are determined based on alternating minimization and estimated channels, and a detailed example is described above.

Figure 7:
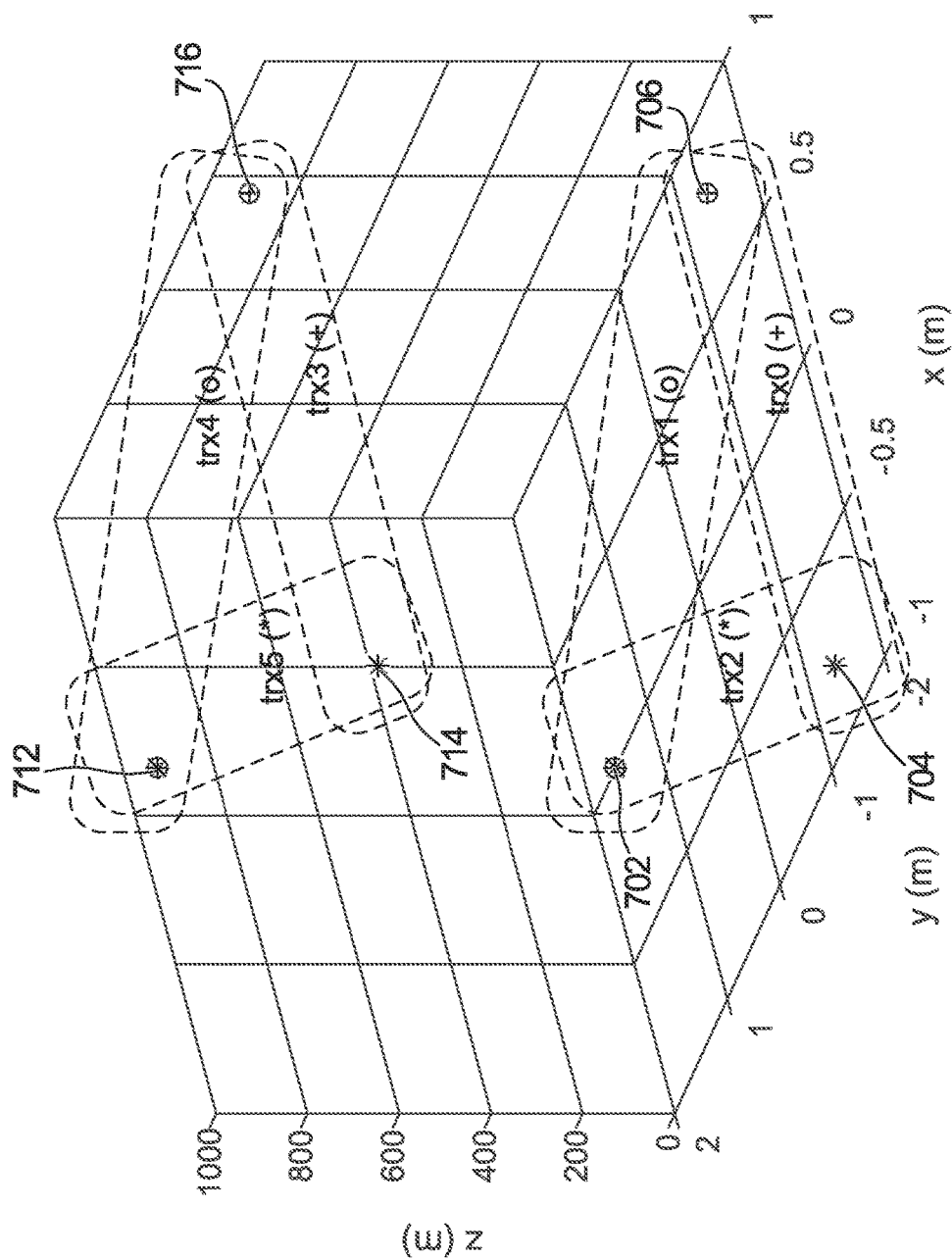
FIG. 7 is a plot illustrating a further example antenna arrangement referred to herein as an "equilateral triangle" arrangement, including antenna elements that are common to multiple pairs of antenna elements.

FIG. 7 is a plot illustrating a further example antenna arrangement referred to herein as an "equilateral triangle" arrangement, including antenna elements that are common to multiple pairs of antenna elements. Such common antenna elements reduce the number of antenna elements relative to embodiments in which a respective antenna element is provided at each vertex. In FIG. 7, an antenna element is provided at each of the vertices 702, 704, 706 at one end of a wireless communication link, and at each of the vertices 712, 714, 716 at the other end of the link. With such an antenna arrangement, each antenna element is coupled to multiple transceivers. The vertices and antenna elements are aligned with each other to form vertices of an equilateral triangle in the example shown. The edges between the vertices are all of equal length in this example. In FIG. 7, the relative rotation between the sets of vertices 702/704/706 and 712/714/716, and the antenna elements at those vertices, is 0.

The distances between the vertices in FIG. 7 are all equal. FIG. 7 is an example in which antenna spacing can be parameterized by a single distance parameter. The equal-distance constraint represents one possible embodiment to simplify the optimization search, but different spacings could be searched in other embodiments. Based on an optimization search of antenna spacings at each of 0, 90, 180, and 270 degrees of rotation, antenna element spacing is chosen to be equal or approximately equal to $\sqrt{\lambda*D/3}$ and the rotation angle is chosen to be 0 degrees.

The precoding and equalization matrices are determined based on alternating minimization and estimated channels, and a detailed example is described above.

Figure 8:
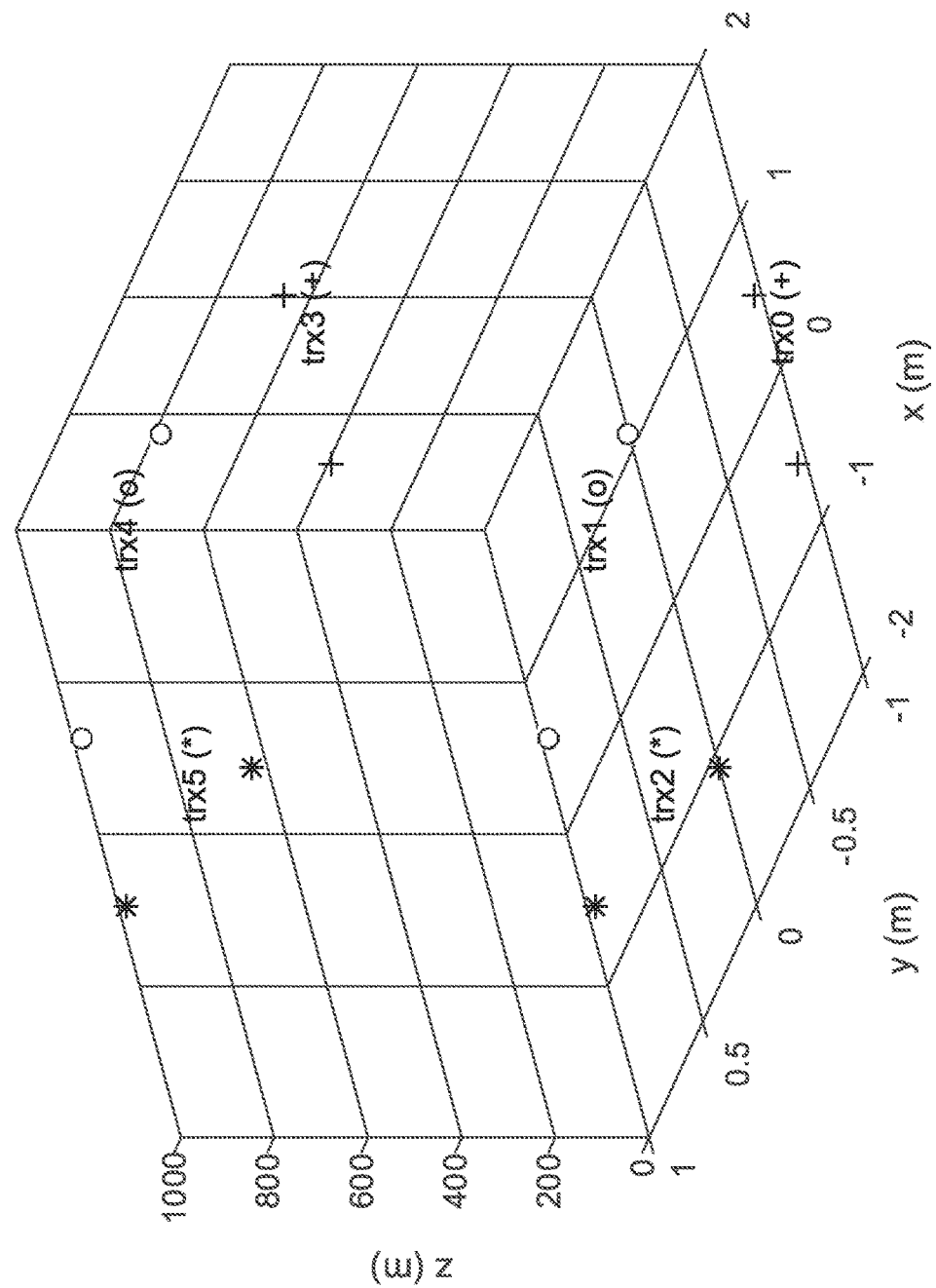
FIG. 8 is a plot illustrating another example antenna arrangement referred to herein as a "hexagon" arrangement, that includes a respective pair of antenna elements for connection to each of three transceivers and in which the antenna elements are arranged differently than in FIG. 5.

FIG. 8 is a plot illustrating another example antenna arrangement referred to herein as a "hexagon" arrangement, that includes a respective pair of antenna elements for connection to each of three transceivers and in which the antenna elements are arranged differently than in FIG. 5. As described above with reference to FIG. 5, in implementing an antenna arrangement in accordance with FIG. 8, a respective pair of antenna elements is provided at each vertex in each pair, for connection to three transceivers at each end of a wireless communication link, and each transceiver is coupled to a unique pair of the antenna elements. Edges between vertices in each pair and between adjacent vertices in different pairs trace a hexagon in the example shown. In FIG. 8, the relative rotation between the sets of vertices, and the antenna elements at those vertices, is 0.

The distances between the vertices of each pair, and the distances between adjacent vertices in different pairs, are again constrained to be equal to simplify the optimization search. The equal-distance constraint represents one possible embodiment to simplify the optimization search, but different spacings could be searched in other embodiments. Based on an optimization search of antenna spacings at each of 0, 90, 180, and 270 degrees of rotation, antenna element spacing is chosen to be equal or approximately equal to $\sqrt{\lambda*D/3}$ and the rotation angle is chosen to be 0 degrees.

The precoding and equalization matrices are determined based on alternating minimization and estimated channels, and a detailed example is described above.

Figure 9:
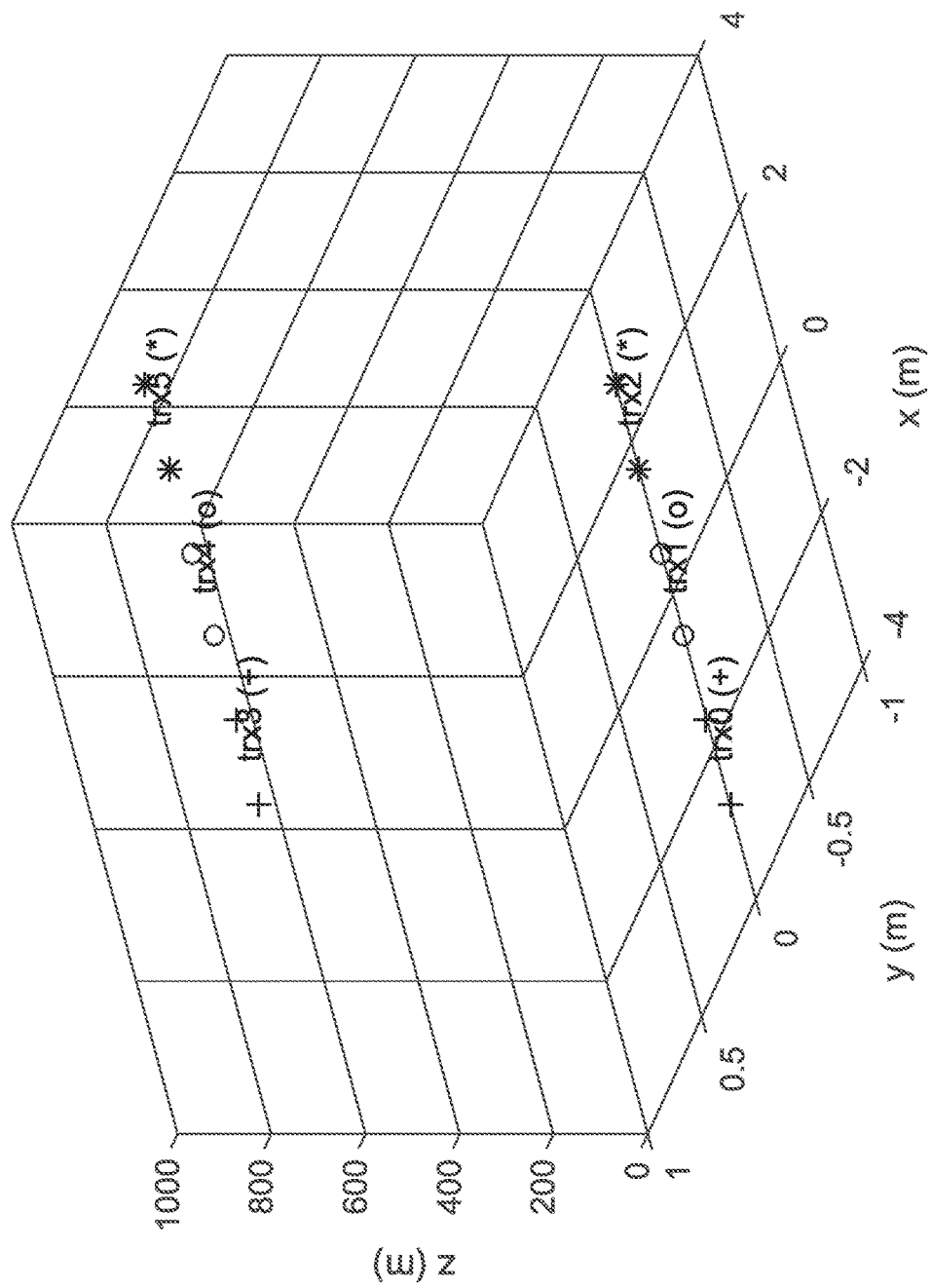
FIG. 9 is a plot illustrating a further example antenna arrangement referred to herein as a "linear" arrangement, that includes a respective pair of antenna elements for connection to each of three transceivers and in which the antenna elements are arranged differently than in FIGS. 5 and 8.

FIG. 9 is a plot illustrating a further example antenna arrangement referred to herein as a "linear" arrangement, that includes a respective pair of antenna elements for connection to each of three transceivers and in which the antenna elements are arranged differently than in FIGS. 5 and 8. As described above with reference to FIGS. 5 and 8, in implementing an antenna arrangement in accordance with FIG. 9, a respective pair of antenna elements is provided at each vertex in each pair, for connection to three transceivers at each end of a wireless communication link, and each transceiver is coupled to a unique pair of the antenna elements. The antenna elements in all pairs are aligned in one direction, the x direction with a common y component in FIG. 9, and with a relative rotation between the sets of vertices and antenna elements at those vertices of 0.

The distances between all adjacent vertices in FIG. 9 are constrained to be equal, to simplify the optimization search, but different spacings could be searched in other embodiments. Based on an optimization search of antenna spacings at each of 0, 90, 180, and 270 degrees of rotation, antenna element spacing is chosen to be equal or approximately equal to $\sqrt{\lambda*D/3}$ and the rotation angle is chosen to be 0 degrees.

The precoding and equalization matrices are determined based on alternating minimization and estimated channels, and a detailed example is described above.

Figure 10:
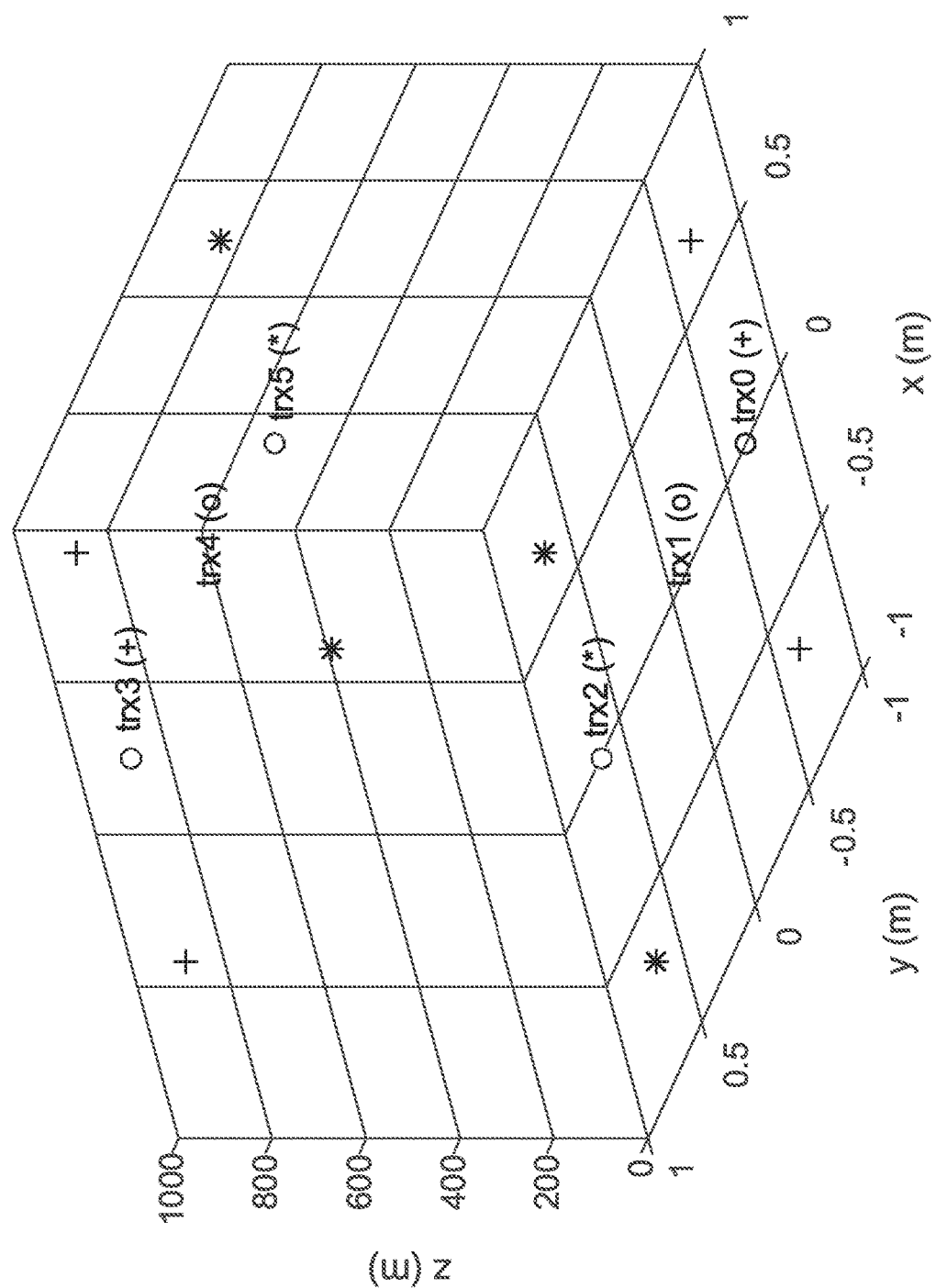
FIG. 10 is a plot illustrating another example antenna arrangement referred to herein as an "H-shape" arrangement, that includes a respective pair of antenna elements for connection to each of three transceivers and in which the antenna elements are arranged differently than in FIGS. 5, 8, and 9.

FIG. 10 is a plot illustrating another example antenna arrangement referred to herein as an "H-shape" arrangement, that includes a respective pair of antenna elements for connection to each of three transceivers and in which the antenna elements are arranged differently than in FIGS. 5, 8, and 9. In implementing an antenna arrangement in accordance with FIG. 10, a respective pair of antenna elements is provided at each vertex in each pair, for connection to three transceivers at each end of a wireless communication link, and each of the transceivers is coupled to a unique pair of the antenna elements. The antenna elements in each of the "+" and "*" pairs are aligned with each other and with one antenna element and vertex in the "o" pair in a first direction, the x direction with a common y component for each pair. For the "o" pair, the vertices and antenna elements are aligned with each other in a second direction perpendicular to the first direction, which is the y direction with a common x component in the example shown.

The arrangement shown in FIG. 10 relates to sets of vertices and antenna elements with a relative rotation of 180 degrees.

As in other example arrangements described above, the distances between adjacent vertices are constrained to be equal, to simplify the optimization search, but different spacings could be searched in other embodiments. Based on an optimization search of antenna spacings at each of 0, 90, 180, and 270 degrees of rotation, antenna element spacing is chosen to be equal or approximately equal to $\sqrt{\lambda * D/2}$ and the rotation angle is chosen to be 180 degrees.

The precoding and equalization matrices are determined based on alternating minimization and estimated channels, and a detailed example is described above.

Figure 11:
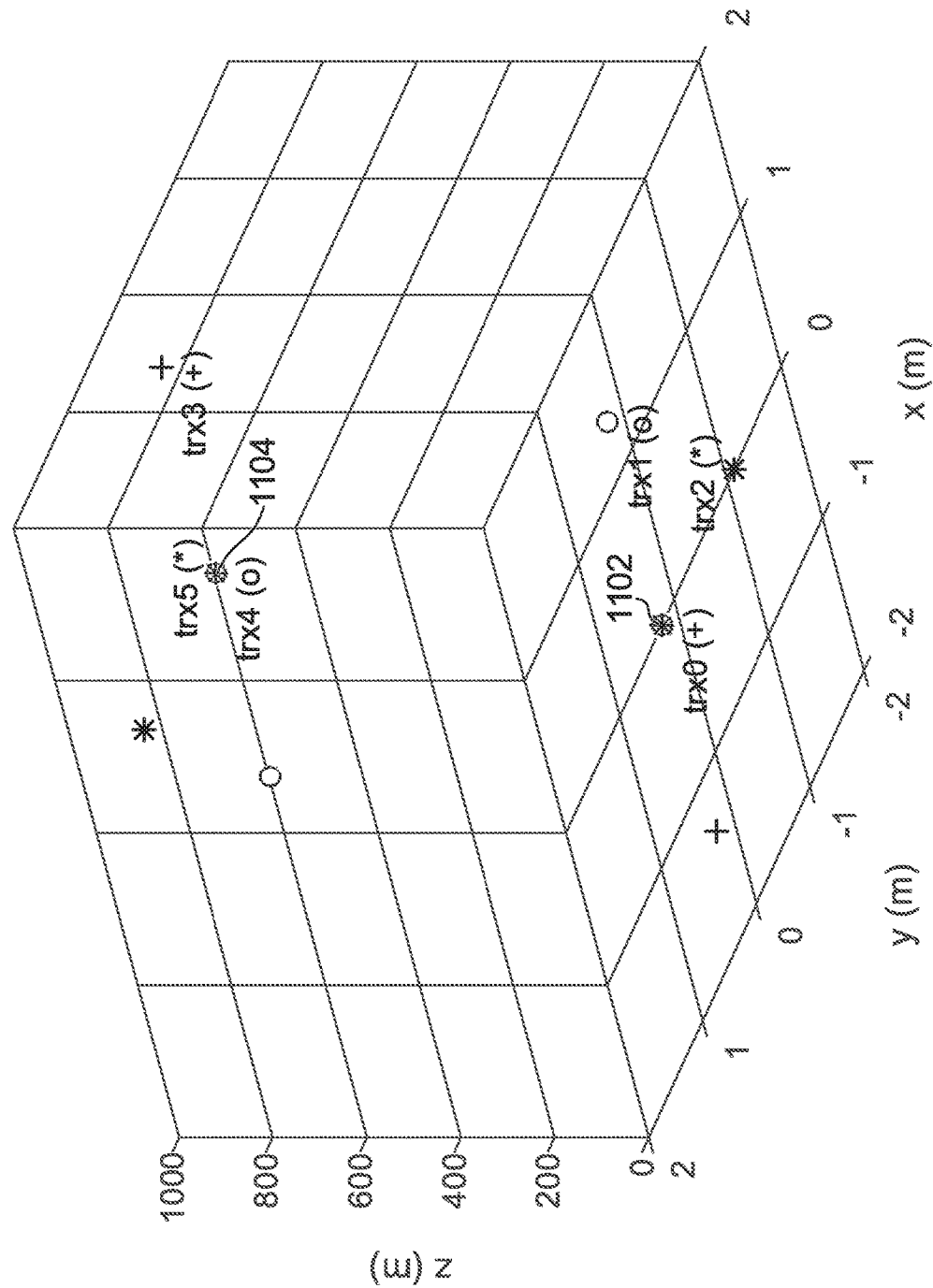
FIG. 11 is a plot illustrating an example antenna arrangement referred to herein as a "T-shape" arrangement, including an antenna element that is common to all pairs of antenna elements.

FIG. 11 is a plot illustrating an example antenna arrangement referred to herein as a "T-shape" arrangement, including an antenna element that is common to all pairs of antenna elements. A single antenna element could be implemented at the vertex 1102 and coupled to multiple transceivers, and similarly a single antenna element could be implemented at the vertex 1104 and coupled to multiple transceivers. Each of the transceivers at each end of the wireless link in this example is coupled to one common antenna element at the vertex 1102 or 1104, and to one other antenna element that is connected to only one transceiver. Each common vertex 1102, 1104 is aligned with two other vertices in a first direction, the x direction with a common y component in FIG. 11, and with another antenna element and vertex, in the "*" pairs in the example shown, along a second direction perpendicular to the first direction. In FIG. 11, the second direction is the y direction with a common x component.

The relative rotation between the sets of vertices in FIG. 11, and the antenna elements positioned at those vertices, is 180 degrees.

The distances between one vertex in each pair and the common vertex 1102, 1104 are constrained to be equal, to simplify the optimization search, but different spacings could be searched in other embodiments. Based on an optimization search of antenna spacings at each of 0, 90, 180, and 270 degrees of rotation, antenna element spacing is chosen to be equal or approximately equal to $\sqrt{\lambda * D/2}$ and the rotation angle is chosen to be 180 degrees.

The precoding and equalization matrices are determined based on alternating minimization and estimated channels, and a detailed example is described above.

Figure 12:
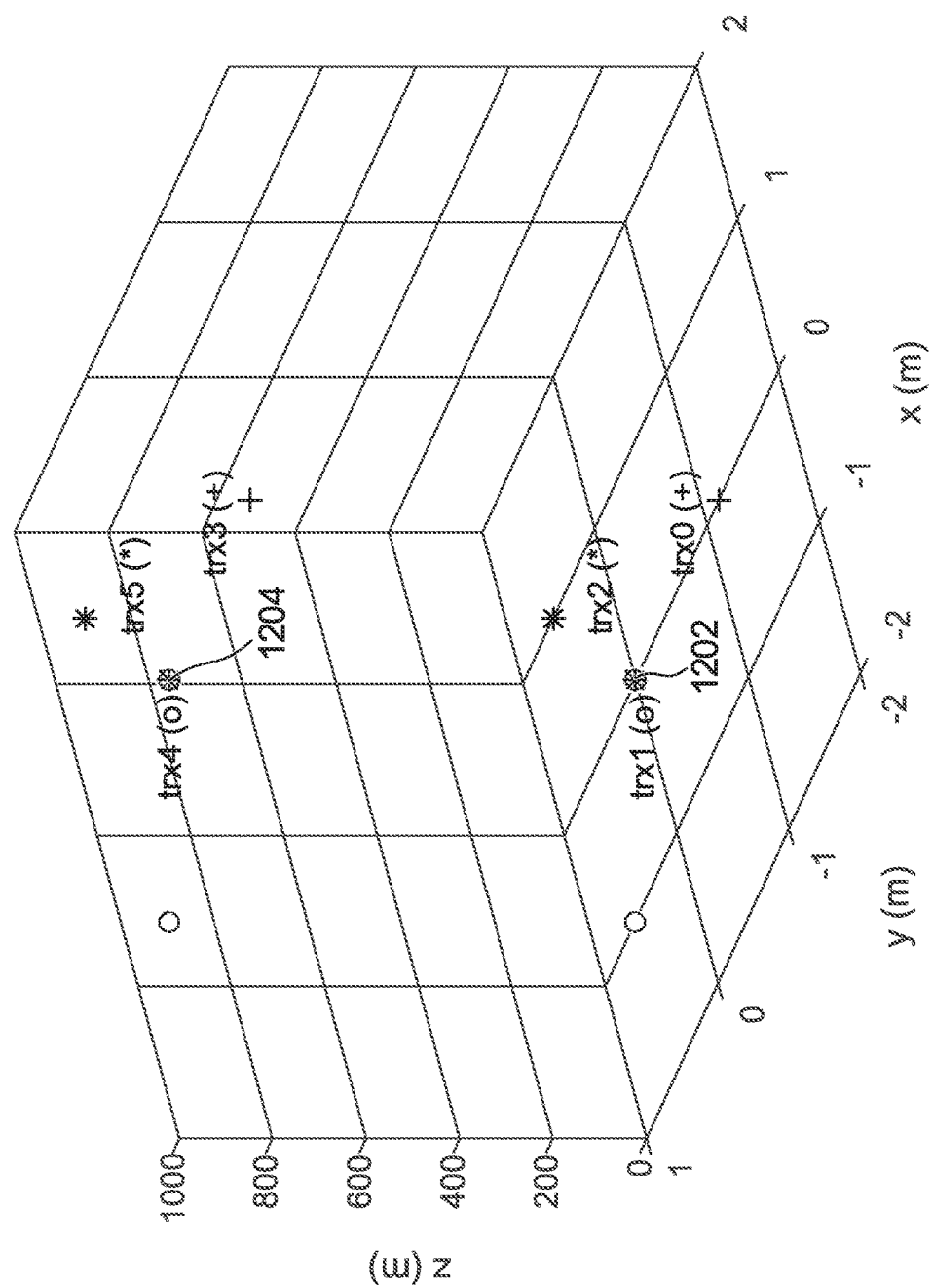
FIG. 12 is a plot illustrating an example antenna arrangement referred to herein as a "Y-shape" arrangement, including an antenna element that is common to all pairs of antenna elements and in which the antenna elements are arranged differently than in FIG. 11.

FIG. 12 is a plot illustrating an example antenna arrangement referred to herein as a "Y-shape" arrangement, including an antenna element that is common to all pairs of antenna elements and in which the antenna elements are arranged differently than in FIG. 11. A respective single antenna element could be implemented at each of the common vertices 1202, 1204 and coupled to multiple transceivers, with each transceiver also being coupled to one other antenna element that is connected to only one transceiver. Each common vertex 1202, 1204 and common antenna element is aligned with the other antenna element in each pair in respective directions, which are equally spaced by 120 degrees in the example shown. The relative rotation between the sets of vertices in FIG. 12, and the antenna elements positioned at those vertices, is 0.

In FIG. 12, the distances between one vertex in each pair and the common vertex 1202, 1204 in FIG. 12 are constrained to be equal, to simplify the optimization search, but different spacings could be searched in other embodiments. Based on an optimization search of antenna spacings at each of 0, 90, 180, and 270 degrees of rotation, antenna element spacing is chosen to be equal or approximately equal to $\sqrt[3]{\lambda * D * 10/27}$ and the rotation angle is chosen to be 0 degrees.

The precoding and equalization matrices are determined based on alternating minimization and estimated channels, and a detailed example is described above.

Figure 13:
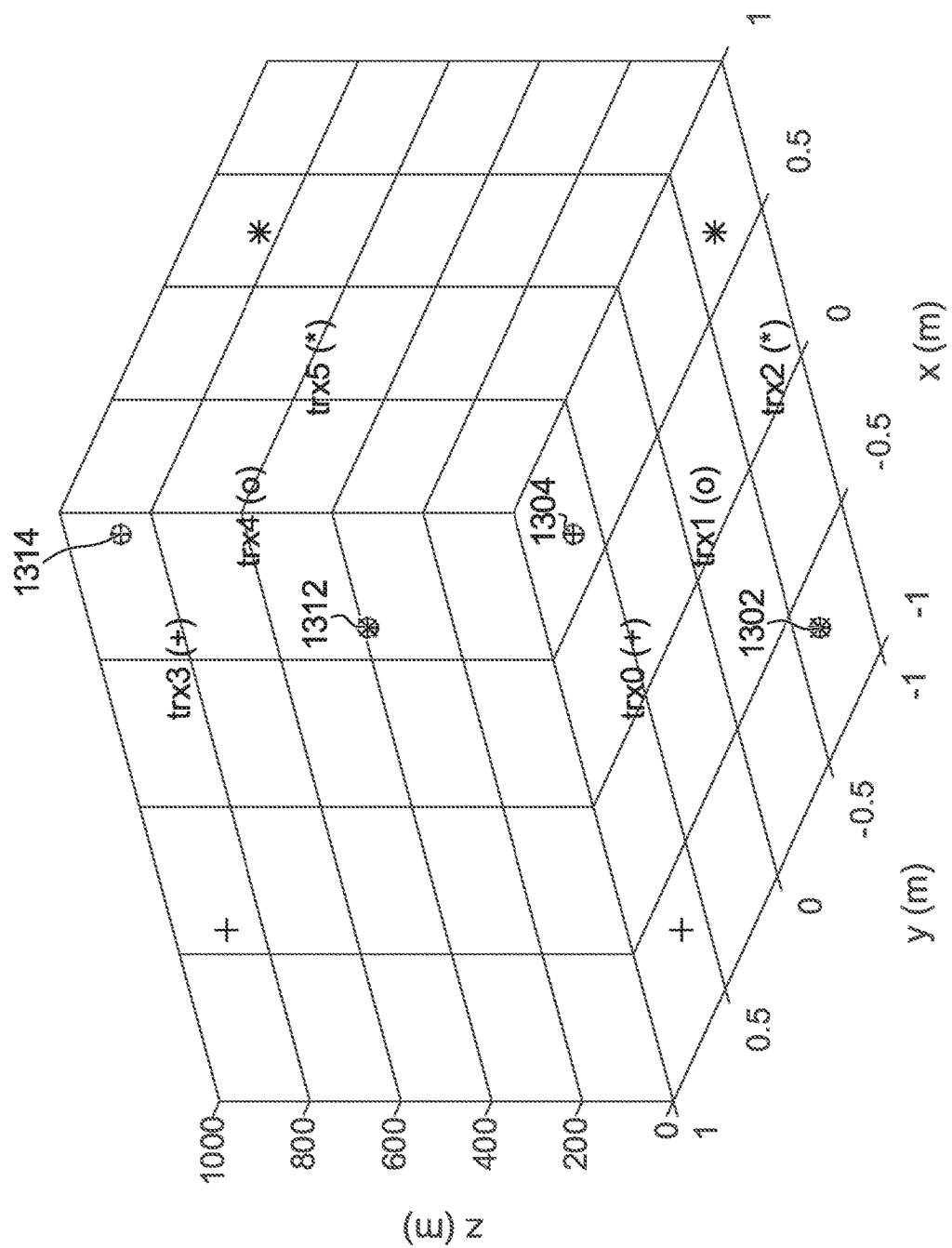
FIG. 13 is a plot illustrating an example antenna arrangement referred to herein as a "Z-shape" arrangement, including two antenna elements that are common to multiple pairs of antenna elements.

FIG. 13 is a plot illustrating an example antenna arrangement referred to herein as a "Z-shape" arrangement, including two antenna elements that are common to multiple pairs of antenna elements. In FIG. 13, a respective single antenna element is provided at each of the vertices 1302, 1304 at one end of a wireless communication link, and at each of the vertices 1312, 1314 at the other end of the link. With such an antenna arrangement, each common antenna element is coupled to multiple transceivers. The transceivers for the cross and asterisk pairs are connected to one common antenna element and to one unique antenna element that is not connected to any other transceiver. The transceiver for the circle pair is connected to the common antenna elements at the common vertices 1302/1304, 1312/1314. The vertices and antenna elements are aligned with each other in parallel directions in FIG. 13, and the circle pair includes vertices and antenna elements which are from different pairs but are not adjacent to each other, to form a Z-shape. In FIG. 13, the relative rotation between vertices, and the antenna elements at those vertices, is 0.

The Z-shape in FIG. 13 is one example, and the circle pair could include the other cross and asterisk vertices and antenna elements, at the left side of the cross pair and the right side of the asterisk pair, in another embodiment.

The distances between adjacent vertices are constrained to be the same in FIG. 13 to simplify the optimization search, but different spacings could be searched in other embodiments. Based on an optimization search of antenna spacings at each of 0, 90, 180, and 270 degrees of rotation, antenna element spacing is chosen to be equal or approximately equal to $\sqrt{\lambda * D/2}$ and the rotation angle is chosen to be 0 degrees.

The precoding and equalization matrices are determined based on alternating minimization and estimated channels, and a detailed example is described above.

Figure 14:
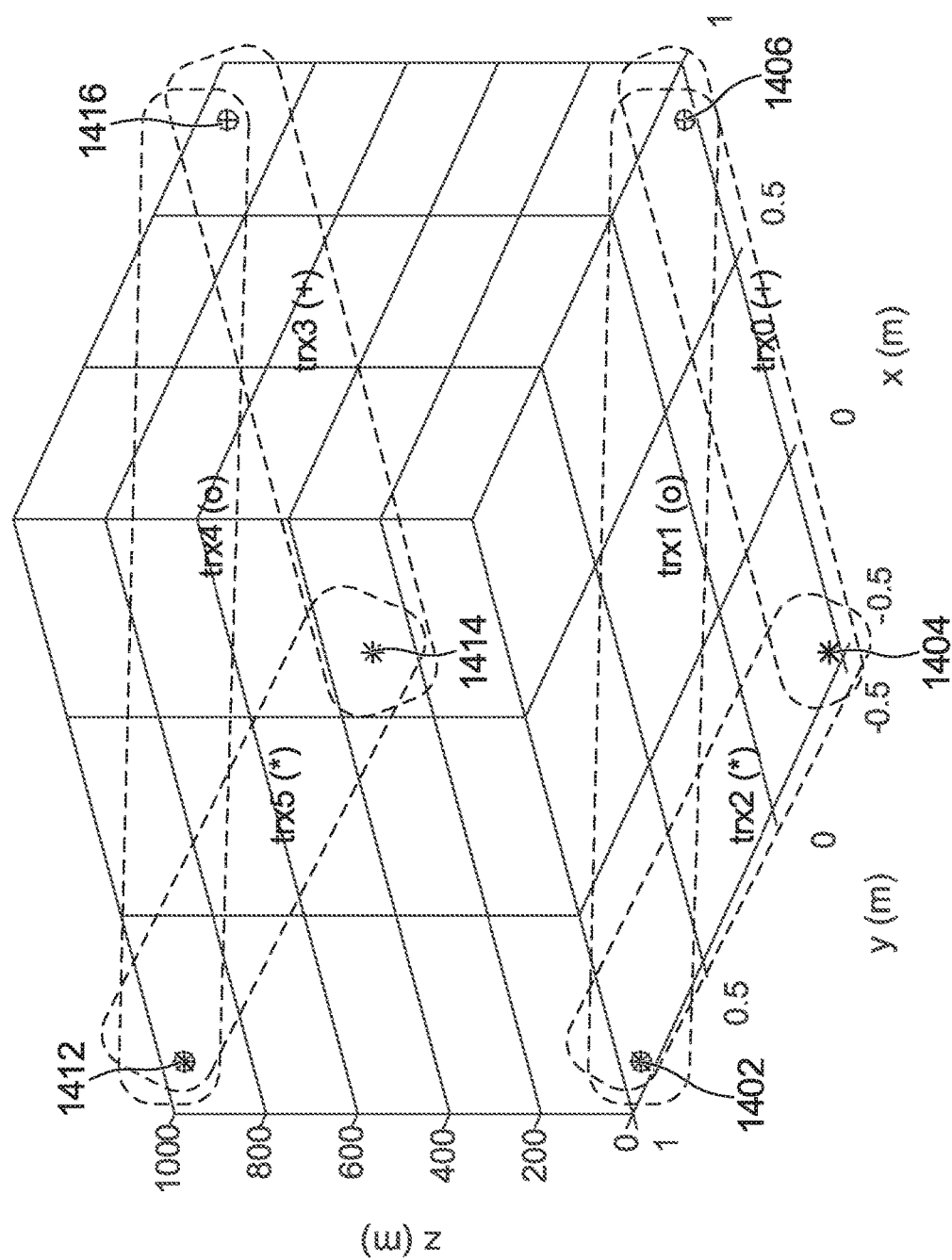
FIG. 14 is a plot illustrating an example antenna arrangement referred to herein as a "right triangle" arrangement, including antenna elements that are common to multiple pairs of antenna elements and in which the antenna elements are arranged differently than in FIG. 7.

FIG. 14 is a plot illustrating an example antenna arrangement referred to herein as a "right triangle" arrangement, including antenna elements that are common to multiple pairs of antenna elements and in which the antenna elements are arranged differently than in FIG. 7. In FIG. 14, as in FIG. 7, an antenna element is provided at each of the vertices 1402, 1404, 1406 at one end of a wireless communication link, and at each of the vertices 1412, 1414, 1416 at the other end of the link. With such an antenna arrangement, each antenna element is coupled to multiple transceivers. The vertices and antenna elements are at vertices of a right triangle in the example shown. In FIG. 14, the relative rotation between the sets of vertices, and the antenna elements at those vertices, is 0.

The distances between the closest vertices in the right angle shape are constrained to be the same in FIG. 14 to simplify the optimization search, but different spacings could be searched in other embodiments. Based on an optimization search of antenna spacings at each of 0, 90, 180, and 270 degrees of rotation, antenna element spacing is chosen to be equal or approximately equal to $\sqrt{\lambda * D}/2$ and the rotation angle is chosen to be 0 degrees.

The precoding and equalization matrices are determined based on alternating minimization and estimated channels, and a detailed example is described above.

The example arrangements illustrated in FIGS. 5 to 14 are planar. Planar arrangements, with antenna elements at each end of a link being positioned with corresponding parts or surfaces in one plane at each end and with the planes parallel to each other, may be preferred to reduce or minimize propagation path length differences, for example. With reference to FIG. 14 for instance, if the trx0, trx1, trx2 plane were not parallel to the trx3, trx4, trx5 plane, then the propagation paths between the antenna elements at vertices 1402/1412, 1404/1414, 1406/1416 would all be different, which may complicate determination of antenna element spacing and precoding/equalization matrices for interference alignment. When propagation delays are different, supported system baud rate can be much lower than in the case of a planar arrangement of antenna elements. The multipath resulting from a non-planar arrangement can create a notch in the frequency band and thus limit the useful bandwidth. This could also require a long cyclic prefix to guard against excessive delays, which would in turn increase transmission overhead. Equalization could also be more difficult due to longer channel response. Multipath effects could also complicate determination of antenna element spacing and precoding/equalization matrices, because in this case the channel is no longer flat.

Figure 15:
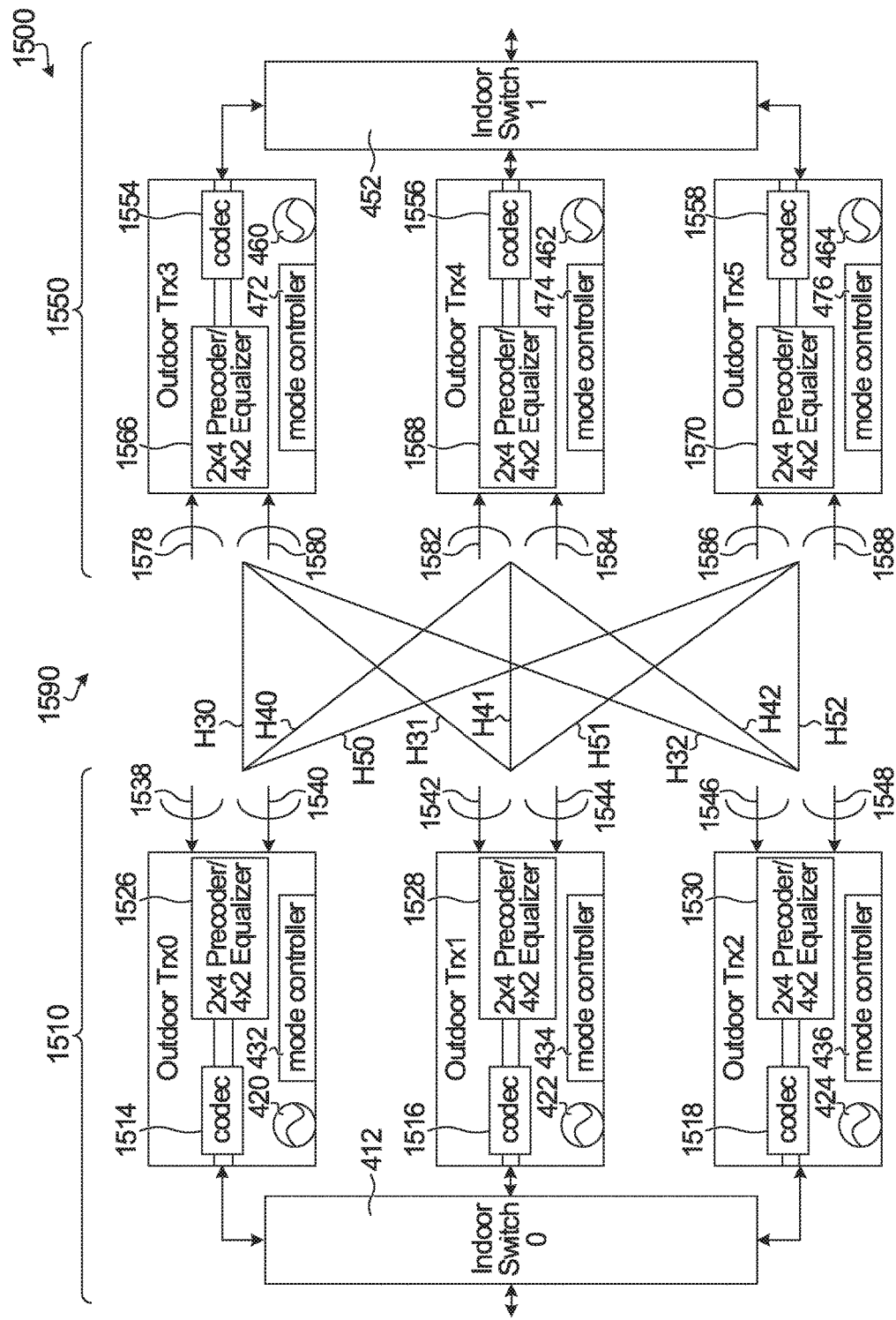
FIG. 15 is a block diagram illustrating a MIMO system in accordance with another embodiment.

FIG. 15 is a block diagram illustrating a MIMO system in accordance with another embodiment. The example MIMO system 1500 in FIG. 15 is similar to the example system 400 in FIG. 4, with the exception of the codecs 1514, 1516, 1518, 1554, 1556, 1558 which process two streams instead of one in FIG. 15, the precoders/equalizers 1526, 1528, 1530, 1566, 1568, 1570, which handle two codec-side streams and four antenna-side streams in FIG. 15, and the antenna elements 1538/1540, 1542/1544, 1546/1548, 1578/1580, 1582/1584, 1586/1588, which can each carry one stream on each of horizontal (H) and vertical (V) polarizations. The system 1500 might be used to implement Cross-Polarization Interference Cancellation (XPIC), for example. The system 1500 could be considered a form of an interference alignment system of three 4×4 MIMO systems.

In FIG. 15, each switched stream from the indoor switches 412, 452 is split into two parallel bit streams, which are encoded, and then mapped to two parallel streams for 2×4 precoding at each transmitting transceiver. In an embodiment, the parallel streams are Quadrature Amplitude Modulation (QAM) streams. The output of the precoding of the two parallel streams is four streams. Each antenna element 1538/1540, 1542/1544, 1546/1548, 1578/1580, 1582/1584, 1586/1588 can carry one stream each on H polarization and V polarizations as noted above, and accordingly two antenna elements at each transceiver carry four streams.

At each receiving transceiver, two antenna elements receive four streams and they are equalized using 4×2 equalization. The output of the equalization is two parallel streams. The two parallel streams are decoded, and could then be concatenated into a single switched stream and provided to an indoor switch 412, 452. In order to avoid congestion in FIG. 15, stream splitting/concatenation are not shown, and the codecs 1514, 1516, 1518, 1554, 1556, 1558 are used to represent coders/decoder and mappers/demappers for precoding or after equalization.

Various illustrative examples of antenna arrangements and MIMO systems are described above. In more general terms, an apparatus according to an embodiment includes communication modules, illustratively transceivers as described herein, and antenna elements. Subsets of the antenna elements are coupled to each communication module and distances between the antenna elements selected based on a shape defined by the antenna elements, an LoS distance between the antenna elements and remote antenna elements with which the antenna elements are intended to exchange signals, and interference alignment between the antenna elements and the remote antenna elements.

Figure 18:
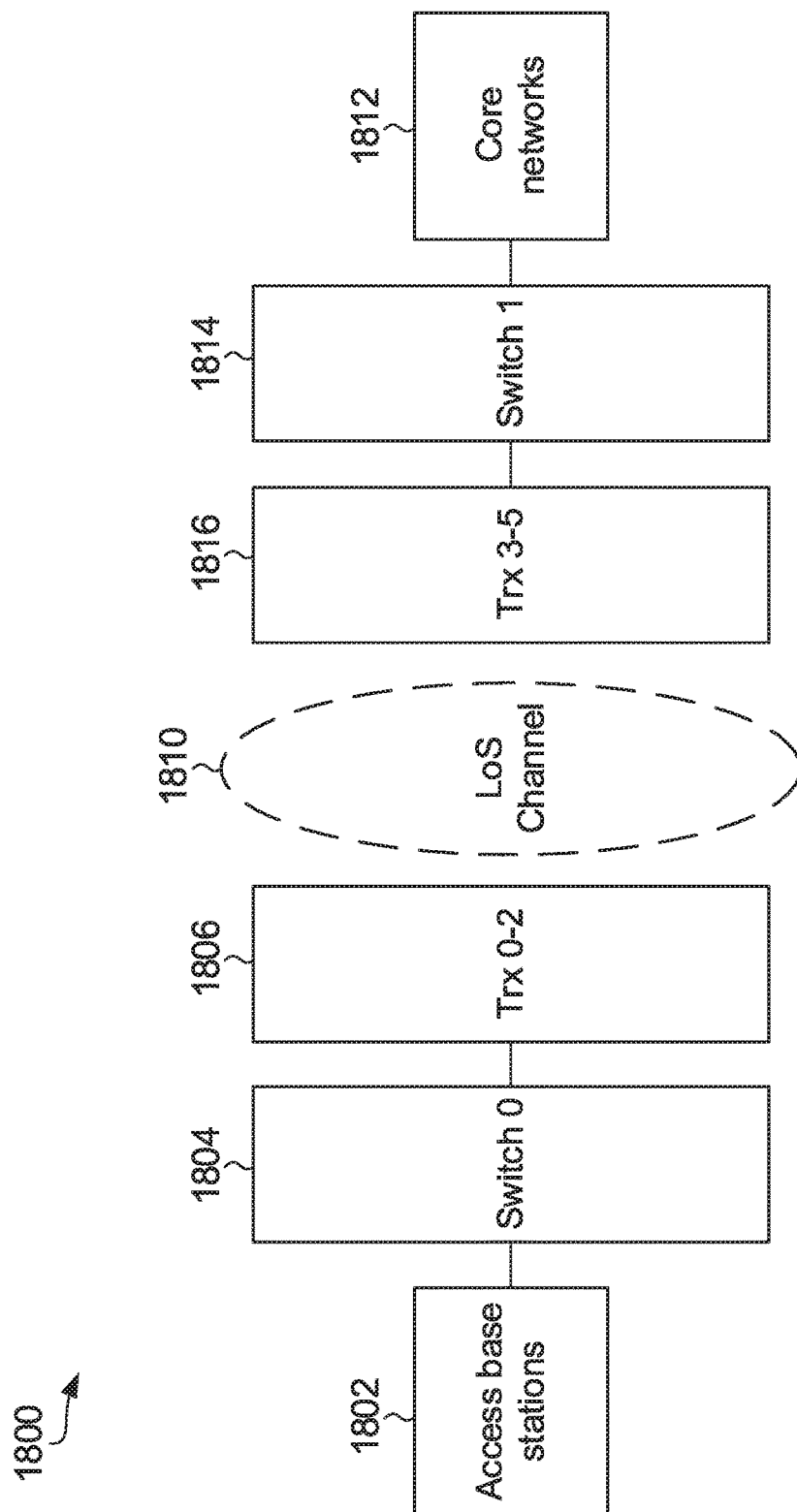
FIG. 18 is a block diagram of an example application of an embodiment to backhaul in a communication system.

Examples of such an apparatus are illustrated at each end of the wireless link or channel 490, 1590, 1810 in FIGS. 4, 15, and 18, respectively. A search-based approach to determining antenna spacing distances, and rotation angles, is also disclosed herein by way of example.

The antenna element subsets could include pairs of antenna elements as shown in FIGS. 5 to 14, which are intended as illustrated examples. Features disclosed herein could also or instead be applied to antenna element subsets that include more than two antenna elements. For example, in another embodiment, equipment at each end of an LoS wireless link includes five units with three antennas, and could use interference alignment to transmit five streams over the wireless link.

Some antenna arrangements include a separate antenna element subset for each communication module, and each of the communication modules is coupled to a unique subset of the antenna elements. FIGS. 5, 6, and 8 to 10 illustrate examples in which three unique pairs of antenna elements would be coupled to respective communication modules at each end of a wireless link. Alignment of vertices and antenna elements in such arrangements are also described above. Antenna element subsets could include more than two antenna elements in other embodiments, with the antenna elements aligned in each subset and between subsets in a manner similar to that shown in FIGS. 5, 6, and 8 to 10.

In the triangular arrangements such as those shown in FIGS. 7 and 14, for example, each of the antenna elements is common to multiple pairs and coupled to multiple communication modules. The examples shown in FIGS. 11 and 12 include one antenna element that is common to all of the pairs and is coupled to multiple communication modules, and the example shown in FIG. 13 includes two antenna elements that are common to multiple pairs and coupled to multiple communication modules. Again, antenna element subsets could include more than two antenna elements in other embodiments, with the antenna elements aligned in each subset and between subsets in a manner similar to that shown in FIGS. 7 and 11 to 14.

The present disclosure encompasses an antenna arrangement in which a shape includes three or more and six or less vertices on one side of an LoS wireless link and a rotational version of the same arrangement, with a zero or nonzero rotation around a propagation direction, on the other side of the wireless link. Antenna elements are positioned at each vertex, for interference alignment with adjusted distances between 0 and $\sqrt{\lambda * D}$ for every edge in an embodiment, where D is the distance between a transmitting communication module and a receiving communication module and $\lambda$ is the wavelength of wireless communication signals transferred on the wireless link.

Figure 16:
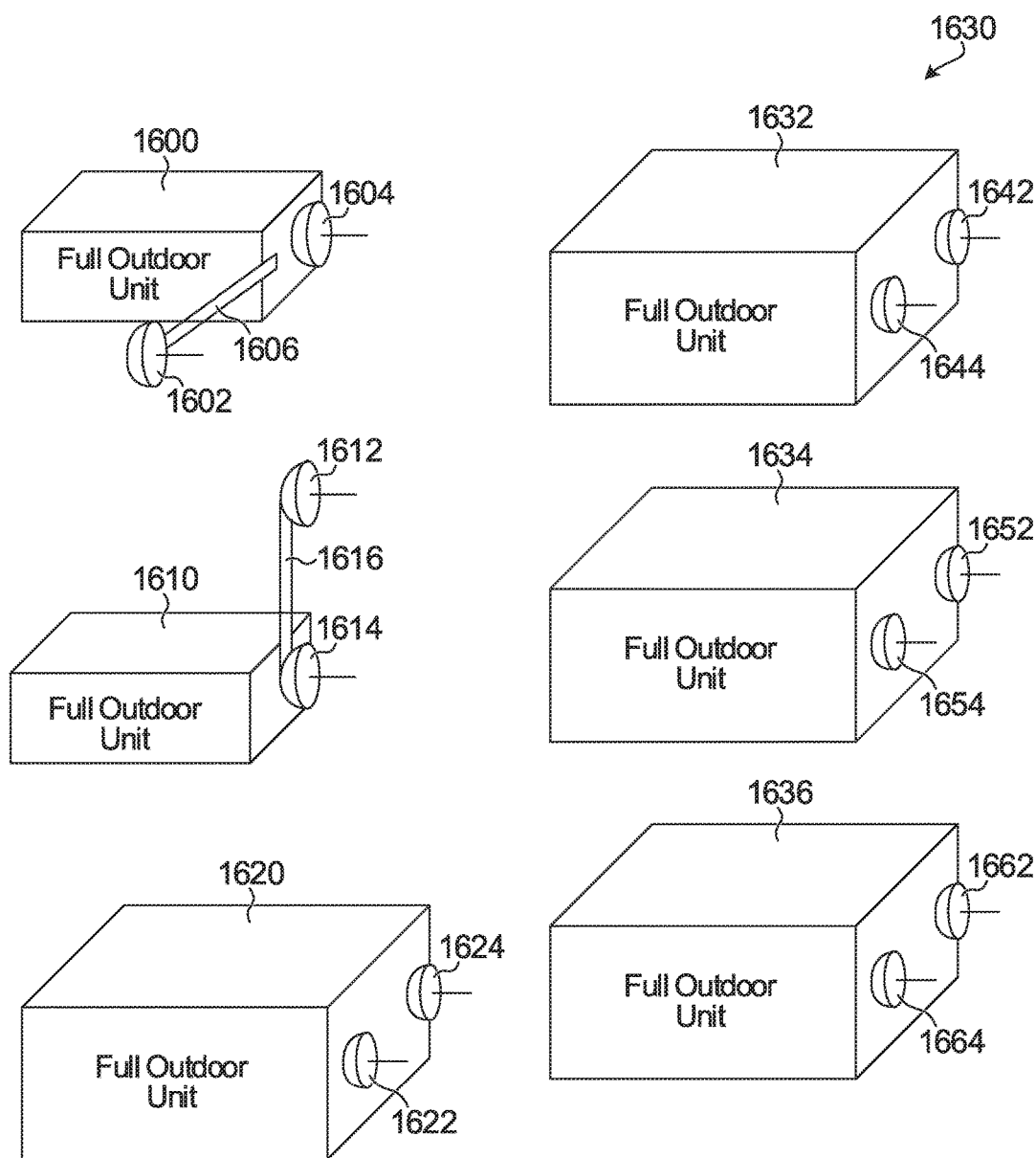
FIG. 16 is a block diagram illustrating example outdoor units (ODUs) that could be used in implementing a MIMO system.

FIG. 16 is a block diagram illustrating example ODUs that could be used in implementing a MIMO system. Three different types of ODUs are shown at 1600, 1610, 1620. Each ODU could implement a communication module such as a transceiver, and include transceiver components as shown in FIGS. 4 and 15, for example.

The example ODUs 1600, 1610 each include one direct mount antenna element 1604, 1614 that is mounted to a housing of the ODU, and a further antenna element 1602, 1612 that is indirectly mounted to the ODU housing using a waveguide 1606, 1616. The waveguides 1606, 1616 could be extendable waveguides to enable adjustment of distance between the antenna elements 1602/1604, 1612/1614 and/or relative orientations between the antenna elements. The ODU 1600 shows an example of a parallel mount of the antenna element 1602 relative to the antenna element 1604 and the ODU housing, and the ODU 1610 shows an example of a vertical mount of the antenna element 1612 relative to the antenna element 1614 and the ODU housing. Other orientations are also possible to implement antenna arrangements as disclosed herein. The ODU 1620 includes two direct mount antenna elements 1622, 1624 in an orientation that could be considered a parallel mount relative to the ODU housing.

At 1630, FIG. 16 shows a combination of three ODUs 1632, 1634, 1636, which could be used to implement equipment at each side of a wireless communication link with an antenna arrangement as shown in FIG. 5. For example, the ODUs could be stacked vertically as shown at 1630 at one end of a wireless channel, and rotated by 90 degrees and arranged horizontally at the other end.

More generally, ODUs with direct mounted antenna elements as shown at 1642, 1644, 1652, 1654, 1662, 1664 and/or indirect mounted antenna elements as shown at 1602, 1612 could be used to implement any of the antenna arrangements disclosed herein. ODUs and/or their antenna elements could be oriented to position the antenna elements in any arrangement. In antenna arrangements with common antenna elements, multiple ODUs could be connected to the common antenna elements. An ODU transceiver could be connected, through a waveguide for example, to a direct mounted or indirect mounted antenna element of another ODU.

Indirect mounted antenna elements and varying ODU orientations represent examples of how antenna elements could be positioned in different antenna arrangements as disclosed herein. An ODU housing could also or instead accommodate different direct mount positions for direct mount antenna elements. Other options for arranging antenna elements are also possible.

Separate ODUs represent one example implementation. At mm-wave frequency, for example, all antennas elements could be integrated into one panel or unit in equipment at each end of a wireless channel. Antenna elements could therefore be implemented in one, or more than one, physical device.

Figure 17:
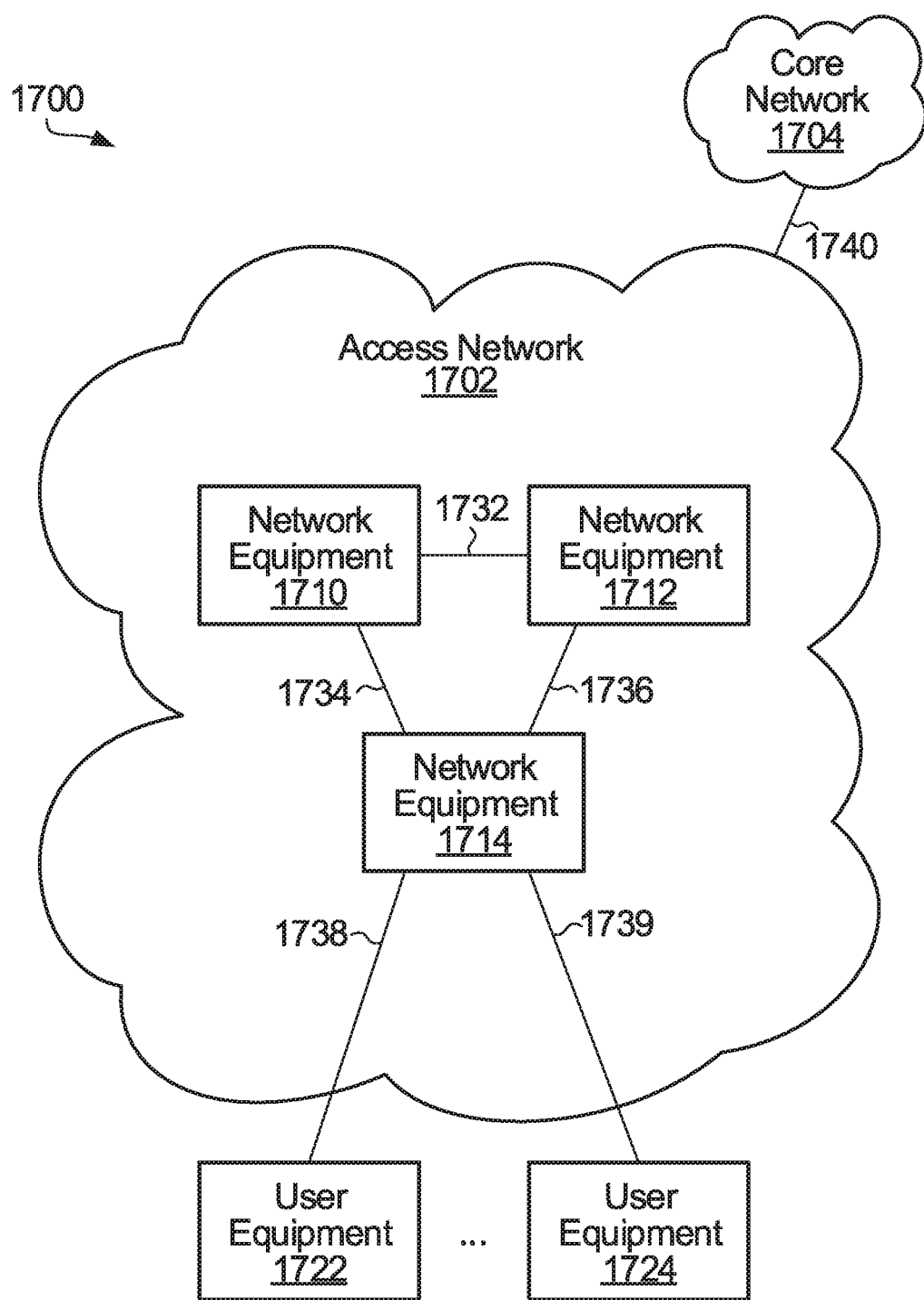
FIG. 17 is a block diagram of an example communication system.

FIG. 17 is a block diagram of an example communication system in which embodiments of the present disclosure could be implemented. The example communication system 1700 in FIG. 17 includes an access network 1702 and a core network 1704. The access network 1702 includes network equipment 1710, 1712, 1714 which communicates over network communication links 1732, 1734, 1736, and user equipment 1722, 1724 which communicates with network equipment 1714 in the example shown, over access communication links 1738, 1739. The access network 1702 communicates with the core network 1704 over another network communication link 1740. The core network 1704, like the access network 1702, may include network equipment that communicates with one or more installations of the network equipment 1710, 1712, 1714 in the access network 1702. However, in a communication system with an access network 1702 and a core network 1704, the core network might not itself directly provide communication service to user equipment.

The communication system 1700 is intended solely as an illustrative example. An access network 1702 could include more or fewer than three installations of network equipment, for example, which might or might not all directly communicate with each other as shown. Also, more than one installation of network equipment in the access network 1702 could provide communication service to user equipment. There could be more than one access network 1702 coupled to a core network 1704. It should also be appreciated that the present disclosure is not in any way limited to communication systems having an access network/core network structure.

Considering the access network 1702, any of various implementations are possible. The exact structure of network equipment 1710, 1712, 1714, and user equipment 1722, 1724 for which such network equipment provides communication service, is implementation-dependent. The equipment 410/450, 1510/1550 in FIGS. 4 and 15 are examples of communication equipment that could be implemented as at least the network equipment 1710, 1712, 1714, for wireless backhaul for example.

At least the network equipment 1714 that provides communication service to the user equipment 1722, 1724 includes a physical interface and communications circuitry to support access-side communications with the user equipment over the access links 1738, 1739. The access-side physical interface could be in the form of an antenna or an antenna array, for example, where the access communication links 1738, 1739 are wireless links. In the case of wired access communication links 1738, 1739, an access-side physical interface could be a port or a connector to a wired communication medium. Multiple access-side interfaces could be provided at the network equipment 1714 to support multiple access communication links 1738, 1739 of the same type or different types, for instance. The type of communications circuitry coupled to the access-side physical interface or interfaces at the access network equipment 1714 is dependent upon the type or types of access communication links 1738, 1739 and the communication protocol or protocols used to communicate with the user equipment 1722, 1724.

The network equipment 1710, 1712, 1714 also includes a network-side physical interface, or possibly multiple network-side physical interfaces, and communications circuitry to enable communications with other network equipment in the access network 1702. At least some installations of network equipment 1710, 1712, 1714 also include one or more network-side physical interfaces and communications circuitry to enable communications with core network equipment over the communication link 1740. There could be multiple communication links between network equipment 1710, 1712, 1714 and the core network 1704. Network-side communication links 1732, 1734, 1736 in the access network 1702, and the communication link 1740 to the core network 1704, could be the same type of communication link. In this case the same type of physical interface and the same communications circuitry at the network equipment 1710, 1712, 1714 could support communications between access network equipment within the access network 1702 and between the access network 1702 and the core network 1704. Different physical interfaces and communications circuitry could instead be provided at the network equipment 1710, 1712, 1714 for communications within the access network 1702 and between the access network 1702 and the core network 1704.

Network equipment in the core network 1704 could be similar in structure to the network equipment 1710, 1712, 1714. However, as noted above, network equipment in the core network 1704 might not directly provide communication service to user equipment and therefore might not include access-side physical interfaces for access communication links or associated access-side communications circuitry. Physical interfaces and communications circuitry at network equipment in the core network 1704 could support the same type or types of network communication link or links as in the access network 1702, different type or types of network communication link or links, or both.

Just as the exact structure of physical interfaces at network equipment 1710, 1712, 1714 and network equipment in the core network 1704 is implementation-dependent, the associated communications circuitry is implementation-dependent as well. In general, hardware, firmware, components which execute software, or some combination thereof, might be used in implementing such communications circuitry. Examples of electronic devices that might be suitable for implementing communications circuitry are provided above.

Each installation of user equipment 1722, 1724 includes a physical interface and communications circuitry compatible with an access-side physical interface and communications circuitry at the network equipment 1714, to enable the user equipment to communicate with the network equipment. Multiple physical interfaces of the same or different types could be provided at the user equipment 1722, 1724. The user equipment 1722, 1724 could also include such components as input/output devices through which functions of the user equipment are made available to a user. In the case of a wireless communication device such as a smartphone, for example, these functions could include not only communication functions, but other local functions which need not involve communications. Different types of user equipment 1722, 1724, such as different smartphones for instance, could be serviced by the same network equipment 1714.

Any of the communication links 1732, 1734, 1736, 1738, 1739, 1740, and communication links in the core network 1704 could potentially be or include wireless communication links. Such communication links tend to be used more often within an access network 1702 than in a core network 1704, although wireless communication links at the core network level are possible. An antenna array including multiple antenna elements could be used at each end of a wireless communication link to enable communications over the air. In one embodiment, the techniques disclosed herein are used at least for wireless backhaul in the access network 1702.

FIG. 18 is a block diagram of an example application of an embodiment to backhaul in a communication system. In the example communication system 1800, an LoS channel 1810 is used to provide backhaul from one or more access base stations 1802 to one or more core networks 1804, through switches 1804, 1814, and transceivers 1806, 1816 that include antenna arrangements as disclosed herein. An access base station 1802 could be network equipment 1710, 1712, 1714 as shown in FIG. 17, and a core network 1704 is also shown in FIG. 17.

Figure 19:
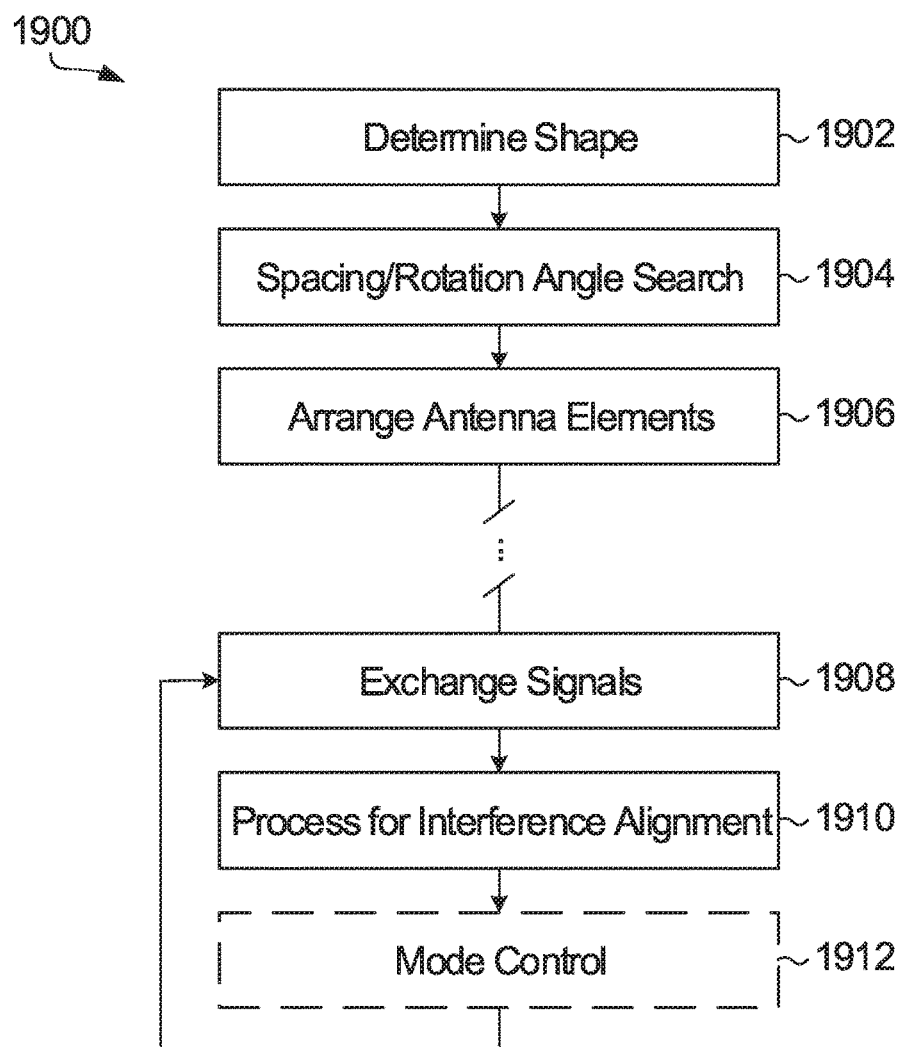
FIG. 19 is a flow diagram illustrating an example method according to another embodiment.

The embodiments described above with reference to FIGS. 1 to 18 relate to apparatus or systems. Methods are also contemplated. FIG. 19 is a flow diagram of an example method according to another embodiment.

The example method 1900 involves determining a shape at 1902, for an antenna arrangement that includes multiple antenna elements and remote antenna elements between which signals are to be exchanged over an LoS communication link. For an initial design, the determining at 1902 could involve selecting a shape. An antenna arrangement could instead be based on a previous design, in which case a shape could be determined at 1902 by consulting that previous design.

At 1904, spacings or distances between the multiple antenna elements, and between the remote antenna elements, are determined. This could involve a search of distances, and possibly rotation angles as well, as shown in FIG. 19. The distances are determined based on the shape, an LoS distance between the multiple antenna elements and the remote antenna elements, and interference alignment between the multiple antenna elements and the remote antenna elements. In an embodiment, determining the spacings at 1904 involves performing interference alignment computations for each of a number of distances within a search space, and selecting distances between the antenna elements based on the interference alignment computations. One or more constraints could be applied to the distances to define the search space. For example, as described above, certain distances could be constrained to be equal. This represents an example of a constraint that could be applied to defined the search space.

In embodiments in which rotation angles are also searched, the search at 1904 could involve performing the interference alignment computations for each of the distances in the search space and each of a number of rotation angles between the multiple antenna elements and the remote antenna elements. One or more constraints could also be applied to the rotation angles to define a rotation angle search space, as in the example of 0, 90, 180, and 270 degree rotations described herein.

As noted above, an antenna arrangement could be based on a previous design, and the distances and possibly a rotation angle could be determined at 1904 by consulting that previous design.

The antenna elements are arranged into the determined shape and at the determined distances, at 1906. This could involve installing respective communication modules, each of which includes a subset of the antenna elements, to arrange the antenna elements into the determined shape and at the determined distances. An example is shown in FIG. 16, in which multiple ODUs are positioned to arrange antenna elements at desired locations. Units that include more than two antenna elements could also or instead be used. Although FIG. 19 shows only one arrangement operation at 1906, antenna elements are arranged at each end of an LoS link.

The shape could include any of the above examples, and others consistent with the present disclosure. In some embodiments, the antenna elements include a respective unique subset of antenna elements to be coupled to each of a number of communication modules. Such antenna arrangements include those consistent with FIGS. 5, 6, and 8 to 10, and similar antenna arrangements with more than two antenna elements coupled to each communication module. Alignment of vertices and antenna elements in such arrangements are also described above.

Other antenna arrangements include antenna elements that are common to multiple subsets and coupled to multiple communication modules. In the arrangements shown in FIGS. 7 and 14, for example, the shape is a triangle and each of the antenna elements is common to multiple pairs and coupled to multiple communication modules. In similar antenna arrangements with more than two antenna elements coupled to each communication module, a triangular shape could be formed using multiple antenna elements in each subset that are common to multiple subsets.

The examples shown in FIGS. 11 and 12 are illustrative of shapes that include one antenna element that is common to all of the subsets and is coupled to multiple communication modules. The Z-shape shown in FIG. 13 is an example of a shape that includes two antenna elements that are common to multiple subsets and coupled to multiple communication modules.

After an antenna arrangement has been installed, it can be used to exchange signals as shown at 1908. This could involve either or both of transmitting the signals and receiving the signals.

The signals are processed for interference alignment at 1910. For example, at a transmitting communication module, the processing could involve precoding the signals for transmission, using precoding matrices computed for interference alignment at communication modules that are coupled to remote antenna elements. At a receiving communication module, received signals could be equalized, using equalization matrices computed for interference alignment at that communication module.

Some embodiments may also support mode control, to control a mode of operation of communication modules between an interference alignment mode and a redundancy mode, for example. This is shown as an optional procedure at 1912.

The example method 1900 is illustrative of one embodiment. In other embodiments, similar or different operations could be performed in a similar or different order. Various ways to perform the illustrated operations, as well as examples of other operations that may be performed, are described herein. For example, the method 1900 includes both antenna arrangement design, installation, and use procedures. These procedures could be performed at different times, at different locations, and/or by different parties.

Performance of various embodiments disclosed herein was evaluated for E-band, with center frequency 83 GHz, edge frequencies 71 and 93 GHz, and antenna arrangements with mainlobe to mainlobe distances for all antenna elements configured for the 83 GHz center frequency. Propagation distance was 1 km direct distance, and Signal to Noise Ratio (SNR)=40 dB. Simulation results for antenna element subsets that include pairs of antenna elements as shown in FIGS. 5 to 14 are provided in the table below. Similar or different results may be observed under different simulation conditions and/or in actual implementations. 2×2 MIMO is also listed in the table as a comparative example.

| Sum SNR (dB) | 71 GHz | 83 GHz | 95 GHz |
| --- | --- | --- | --- |
| Chocolate Bar | 129.0 | 130.6 | 128.8 |
| Rectangle | 123.1 | 124.2 | 122.8 |
| Equilateral Triangle | 107.1 | 128.1 | 118.1 |
| Hexagon | 119.2 | 120.0 | 119.1 |
| Linear | 123.2 | 128.2 | 123 |
| H-shape | 125.6 | 126.0 | 125.6 |
| T-shape | 113.5 | 118.1 | 118.0 |
| Y-shape | 121.1 | 121.8 | 121.0 |
| Z-shape | 124.5 | 126.0 | 124.5 |
| Right triangle | 119.5 | 120.0 | 120.0 |
| 2 × 2 MIMO | 85.8 | 86.0 | 85.8 |

From the table above, it can be seen that the simulation demonstrates higher Sum SNR than the comparative 2×2 MIMO example. The equilateral triangle antenna arrangement exhibited the highest frequency sensitivity (more variance over the frequency range) among the listed examples, and the right triangle antenna arrangement exhibited the lowest frequency sensitivity (least variance over the frequency range) among the listed examples.

What has been described is merely illustrative of the application of principles of embodiments of the present disclosure. Other arrangements and methods can be implemented by those skilled in the art. Although the present disclosure refers to specific features and embodiments, various modifications and combinations can be made. The specification and drawings are, accordingly, to be regarded simply as an illustration of embodiments of the invention as defined by the appended claims, and are contemplated to cover any and all modifications, variations, combinations, or equivalents. Thus, it should be understood that various changes, substitutions and alterations can be made herein without departing from the invention as defined by the appended claims.

Moreover, the scope of the present application is not intended to be limited to particular embodiments of any process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments disclosed herein may be utilized. Accordingly, the appended claims are intended to include within their scope such processes, machines, manufacture, compositions of matter, means, methods, or steps.

For example, the drawings show illustrative example embodiments. The techniques disclosed herein are not limited only to such embodiments. Other embodiments could include similar or different components interconnected in a similar or different order. The numbers of components could also or instead vary between different embodiments.

It should also be appreciated that other implementation details, such as the relative rotations between sets of vertices and antenna elements as shown in the drawings, could be different in different embodiments. In the configuration shown in FIG. 5, for example, the relative rotation between the sets of vertices and antenna elements could be varied from 90 degrees, by 45 degrees for instance, to provide a direct channel matrix rank 2 between each intended transmitter/receiver pair. Other antenna arrangements could also or instead be varied in this manner in an effort to improve performance.

Also, although described primarily in the context of methods and systems, other implementations are also contemplated, such as in the form of instructions stored on a non-transitory processor-readable medium, for example. This is illustrative of an embodiment in the form of a software product. More generally, a software product may be stored in a nonvolatile or non-transitory storage medium, which could be implemented in the form of one or more memory devices, including solid-state memory devices and/or memory devices with movable and possibly even removable storage media. Examples of memory devices include a compact disk read-only memory (CD-ROM), Universal Serial Bus (USB) flash disk, and a removable hard disk. A software product includes a number of instructions, stored on the storage medium, that enable a processor or computer device (personal computer, server, network device, for example) to execute operations or methods as disclosed herein.

We claim:

1. An apparatus comprising:
   a plurality of communication modules; and
   a plurality of antenna elements, with different subsets of antenna elements coupled to each communication module and distances between the plurality of antenna elements selected based on each of the following:
   a shape defined by the plurality of antenna elements,
   a Line of Sight (LoS) distance between the plurality of antenna elements and remote antenna elements with which the plurality of antenna elements is intended to exchange signals, and
   interference alignment between the plurality of antenna elements and the remote antenna elements.

2. The apparatus of claim 1, wherein each of the communication modules comprises one or both of a receiver and a transmitter.

3. The apparatus of claim 1, wherein each of the communication modules comprises a precoder coupled to a subset of the antenna elements to which the communication module is coupled.

4. The apparatus of claim 1, wherein each of the communication modules comprises an equalizer coupled to a subset of the antenna elements to which the communication module is coupled.

5. The apparatus of claim 1, wherein each of the communication modules comprises a mode controller configured to control a mode of operation of the communication module between an interference alignment mode and a redundancy mode.

6. The apparatus of claim 1, wherein each of the communication modules is coupled to a unique subset of the antenna elements.

7. The apparatus of claim 6, wherein the antenna elements in each subset are aligned with each other in a first direction and with antenna elements in other subsets along parallel rows in a second direction perpendicular to the first direction, and arranged with a 90 degree rotation relative to the remote antenna elements and about an axis parallel to a propagation direction between the plurality of antenna elements and the remote antenna elements.

8. The apparatus of claim 1, wherein the plurality of antenna elements include antenna elements that are common to more than one of the subsets and coupled to more than one of the communication modules.

9. The apparatus of claim 8, wherein the plurality of antenna elements are arranged in a triangle, with multiple antenna elements in each subset being common to more than one of the subsets and coupled to more than one of the communication modules.

10. The apparatus of claim 8, wherein the plurality of antenna elements include an antenna element that is common to all of the different subsets and is coupled to more than one of the communication modules.

11. The apparatus of claim 8, wherein the plurality of antenna elements include two antenna elements that are common to more than one of the subsets and coupled to more than one of the communication modules.

12. A method comprising:
    exchanging signals between a plurality of antenna elements and remote antenna elements, the plurality of antenna elements including different subsets of antenna elements coupled to different communication modules, with distances between the plurality of antenna elements selected based on each of the following:
    a shape defined by the plurality of antenna elements,
    a Line of Sight (LoS) distance between the plurality of antenna elements and the remote antenna elements, and
    interference alignment between the plurality of antenna elements and the remote antenna elements; and
    processing the signals for interference alignment.

13. The method of claim 12, wherein the exchanging comprises either or both of: transmitting the signals from the plurality of antenna elements to the remote antenna elements, and receiving the signals at the plurality of antenna elements from the remote antenna elements.

14. The method of claim 12, wherein the processing comprises either or both of:
    precoding the signals for transmission from the plurality of antenna elements to the remote antenna elements, using precoding matrices computed for interference alignment at communication modules coupled to the remote antenna elements; and
    equalizing the signals received at the plurality of antenna elements from the remote antenna elements, using equalization matrices computed for interference alignment at the different communication modules coupled to the plurality of antenna elements.

15. The method of claim 12, further comprising:
    controlling a mode of operation of the communication modules between an interference alignment mode and a redundancy mode.

16. A method comprising:
    determining a shape for an arrangement of a plurality of antenna elements and remote antenna elements between which signals are to be exchanged over a Line of Sight (LoS) communication link;
    determining distances between the antenna elements in the plurality of antenna elements and the remote antenna elements selected based on each of the following:
    the shape,
    a LoS distance between the plurality of antenna elements and the remote antenna elements, and
    interference alignment between the plurality of antenna elements and the remote antenna elements; and
    arranging the antenna elements in the plurality of antenna elements and the remote antenna elements into the determined shape and at the determined distances.

17. The method of claim 16, wherein determining the distances comprises:
    performing interference alignment computations for each of a plurality of distances within a search space; and
    selecting the distances between the antenna elements based on the interference alignment computations.

18. The method of claim 17, further comprising:
    applying a constraint to the distances to define the search space.

19. The method of claim 17, wherein the performing comprises performing the interference alignment computations for each of the plurality of distances within the search space and each of a plurality of rotation angles between the plurality of antenna elements and the remote antenna elements.

20. The method of claim 16, wherein the arranging comprises installing respective communication modules, each of which is coupled to a different subset of the antenna elements, to arrange the antenna elements into the determined shape and at the determined distances.

21. The method of claim 16, wherein the antenna elements include a unique subset of antenna elements to be coupled to each of a plurality of communication modules.

22. The method of claim 21, wherein the shape comprises, in each of the plurality of antenna elements and the remote antenna elements, the antenna elements in each subset aligned with each other in a first direction and antenna elements in other subsets along parallel rows in a second direction perpendicular to the first direction, and a 90 degree rotation between the plurality of antenna elements and the remote antenna elements and about an axis parallel to a propagation direction between the plurality of antenna elements and the remote antenna elements.

23. The method of claim 16, wherein the antenna elements in the plurality of antenna elements include subsets of antenna elements to be coupled to each of a plurality of communication modules, with antenna elements that are common to more than one of the subsets of the antenna elements and coupled to more than one of the communication modules.

24. The method of claim 23, wherein the shape comprises a triangle in each of the plurality of antenna elements and the remote antenna elements, with multiple antenna elements in each subset being common to more than one of the subsets of the antenna elements and coupled to more than one of the communication modules.

25. The method of claim 23, wherein the shape comprises, in each of the plurality of antenna elements and the remote antenna elements, a shape that includes an antenna element that is common to all of the subsets of the antenna elements and is coupled to more than one of the communication modules.

26. The method of claim 23, wherein the shape comprises, in each of the plurality of antenna elements and the remote antenna elements, a shape that includes two antenna elements that are common to more than one of the subsets of the antenna elements and coupled to more than one of the communication modules.

* * * * *